United States Patent [19]

Sakakibara et al.

[11] Patent Number: 5,486,439

[45] Date of Patent: Jan. 23, 1996

[54] ELECTROPHOTOGRAPHIC WITH POLYCARBONATE HAVING CHARGE TRANSPORTING GROUP

[75] Inventors: Teigo Sakakibara, Yokohama; Kiyoshi Sakai, Hachiohji; Toshihiro Kikuchi, Yokohama; Akihiro Senoo, Tokyo, all of Japan

[73] Assignee: Canon Kabushiki Kaisha, Tokyo, Japan

[21] Appl. No.: 193,470

[22] Filed: Feb. 8, 1994

[30] Foreign Application Priority Data

| Feb. 9, 1993 | [JP] | Japan | 5-021192 |
| Feb. 9, 1993 | [JP] | Japan | 5-021193 |
| Feb. 9, 1993 | [JP] | Japan | 5-021194 |

[51] Int. Cl.$^6$ ............................ G03G 5/047; G03G 5/09
[52] U.S. Cl. ................................. 430/59; 430/83
[58] Field of Search ............................ 430/58, 59, 83

[56] References Cited

U.S. PATENT DOCUMENTS

| 3,824,099 | 7/1974 | Champ et al. | |
| 3,877,935 | 4/1975 | Regensburger et al. | 430/58 |
| 4,123,269 | 10/1978 | Van Hoene et al. | |
| 4,150,987 | 4/1979 | Anderson et al. | 430/58 |
| 4,350,751 | 9/1982 | Contois | 430/135 |
| 4,456,671 | 6/1984 | Mabuchi et al. | 430/59 |
| 4,835,081 | 5/1989 | Ong et al. | 430/59 |
| 4,920,022 | 4/1990 | Sakakibara et al. | 430/59 |
| 5,034,296 | 7/1991 | Ong et al. | 430/59 |
| 5,126,223 | 6/1992 | Kikuchi et al. | 430/59 |
| 5,202,207 | 4/1993 | Kanemaru et al. | 430/59 |
| 5,254,423 | 10/1993 | Mayama et al. | 430/58 |
| 5,262,261 | 11/1993 | Kikuchi et al. | 430/59 |
| 5,262,512 | 11/1993 | Yanus et al. | 430/59 |
| 5,283,142 | 2/1994 | Mayama et al. | 430/58 |
| 5,322,753 | 6/1994 | Tamura et al. | 430/59 |

FOREIGN PATENT DOCUMENTS

| 295125 | 12/1988 | European Pat. Off. | G03G 5/06 |
| 356246 | 2/1990 | European Pat. Off. | G03G 5/06 |
| 54-151955 | 11/1979 | Japan | C07C 15/20 |
| 55-52063 | 4/1980 | Japan | G03G 5/06 |
| 58-198043 | 11/1983 | Japan | G03G 5/06 |
| 61-132955 | 6/1986 | Japan | G03G 5/06 |
| WO9322361 | 11/1993 | Japan | C08G 63/00 |

*Primary Examiner*—Roland Martin
*Attorney, Agent, or Firm*—Fitzpatrick, Cella, Harper & Scinto

[57] ABSTRACT

An electrophotographic photosensitive member is constituted by disposing a photosensitive layer on an electroconductive support. The photosensitive layer is characterized by containing a specific polycarbonate having a side chain comprising a charge-transporting group formed by nitrogen atom and benzene ring. The charge-transporting group may preferably has a specific triphenylamine structure, hydrazone structure or biphenyldiamine structure. The photosensitive layer is suitable for providing an electrophotographic apparatus showing excellent electrophotographic characteristics such as a high photosensitivity, a good potential stability in repetitive use.

9 Claims, 1 Drawing Sheet

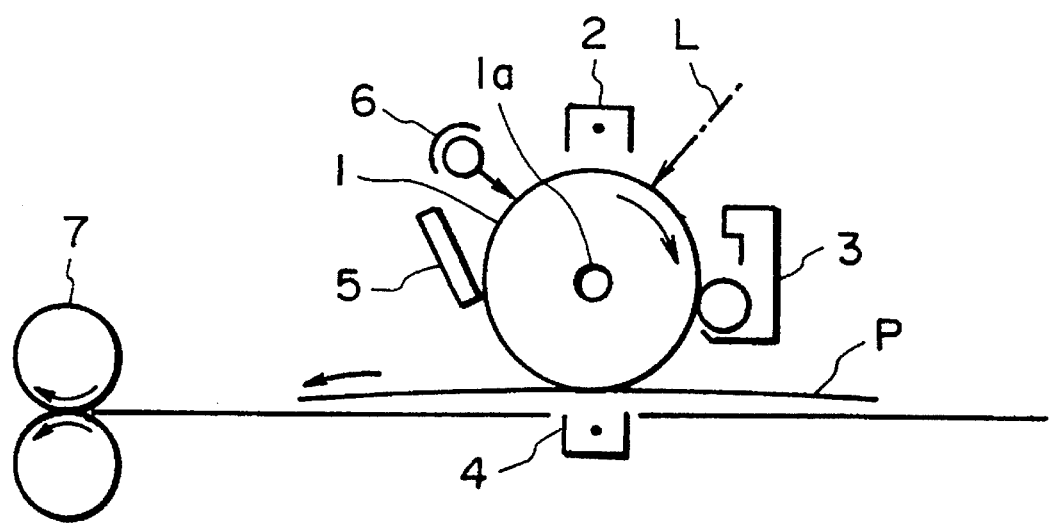

ELECTROPHOTOGRAPHIC WITH POLYCARBONATE HAVING CHARGE TRANSPORTING GROUP

FIELD OF THE INVENTION AND RELATED ART

The present invention relates to an electrophotographic photosensitive member, particularly to an electrophotographic photosensitive member having an organic photoconductive compound.

The present invention also relates to an image forming method using the electrophotographic photosensitive member.

Heretofore, there have been proposed inorganic photosensitive members having a photosensitive layer comprising an inorganic photoconductive material such as selenium, zinc oxide or cadmium as a main component. The inorganic photosensitive members have possessed fundamental properties in respect of electrophotographic characteristics to a certain degree but have encountered problems such as poor film-forming properties, a low plasticity and an expensive production cost. The inorganic photoconductive material generally has a high toxicity. Accordingly, there have been large constraints on production of the photosensitive member and handling of the inorganic photoconductive material.

On the other hand, many organic photosensitive members having a photosensitive layer comprising an organic photoconductive material as a main component have remedied the above drawbacks of the inorganic photosensitive members and has attracted considerable attention, thus having been proposed and also having been put into practical use in some cases. As the organic photoconductive material for use in the organic photosensitive member, there have been proposed a charge transfer complex containing an organic photoconductive material such as poly-N-vinyl carbazole and Lewis acid such as 2,4,7-trinitro-9-fluorenone. The charge transfer complex or the organic photoconductive material has been excellent in light weight properties and film-forming properties but has been inferior to the inorganic photoconductive material in respect of a sensitivity, a durability, a stability against environmental change, etc.

Thereafter, there has been proposed a photosensitive member having a laminate-type structure, wherein a photosensitive layer comprises a charge generation layer (CGL) containing a charge-generating material (CGM) such as organic photoconductive dyes or pigments and a charge transport layer (CTL) containing a charge-transporting material (CTM) (i.e., so-called "function-separation type photosensitive member"). Such a function-separation type photosensitive member has brought about a considerable improvement on a conventional photosensitive member possessing defects such as low sensitivity and poor durability.

The function-separation type photosensitive member allows a wide latitude in selecting a CGM and a CTM. As a result, it is possible to prepare readily a photosensitive member having an arbitrary characteristic.

As examples of the CGM, there have been known various materials such as azo pigments, polycyclic quinone pigments, cyanine colorants, squaric acid dyes and pyrylium salt-type colorants. In the above CGM, many azo pigments have been proposed since the azo pigments have a good light-resistance, a large charge-generating ability, easiness of synthesis, etc.

As examples of the CTM, there have been known various materials including: a pyrazoline compound as disclosed in Japanese Patent Publication (JP-B) No. 4188/1977/ a hydrazone compound as disclosed in JP-B 42380/1980 or Japanese Laid-Open Patent Application (JP-A) No. 52063/1980; a triphenylamine compound as disclosed in JP-B 32372/1983 or JP-A 132955/1986; and a stilbene compound as disclosed in JP-A 151955/1979 or JP-A 198043/1983.

Characteristics required for the photosensitive member may include:

(i) Stability against light and/or heat, (ii) Stability against ozone, NOx and nitric acid generated by corona discharge, and (iii) High electrophotographic characteristics, etc.

In order to improve the electrophotographic characteristics, however, e.g., if a large amount of a CTM is used, the resultant photosensitive member has a poor durability. On the other hand, if a durability is intended to be improved, the electrophotographic characteristics are lowered.

Accordingly, it has been difficult to provide a photosensitive member having both excellent electrophotographic characteristics and a high durability.

SUMMARY OF THE INVENTION

The present invention has accomplished in view of the above circumstances.

An object of the present invention is to provide an electrophotographic photosensitive member excellent in both electrophotographic characteristics and durability.

Another object of the present invention is to provide an image forming method using the photosensitive member.

According to the present invention, there is provided an electrophotographic photosensitive member, comprising a photosensitive layer containing a polycarbonate having a charge-transporting group at least in a side chain.

According to the present invention, there is also provided an image forming method, comprising the steps of:

providing an electrophotographic photosensitive member described above, charging the photosensitive member, performing image-exposure to the photosensitive member to form an electrostatic latent image, and developing the latent image with a toner.

These and other objects, features and advantages of the present invention will become more apparent upon a consideration of the following description of the preferred embodiments of the present invention taken in conjunction with the accompanying drawing.

BRIEF DESCRIPTION OF THE DRAWING

The sole FIGURE is a schematic structural view of an embodiment of an electrophotographic apparatus using the electrophotographic photosensitive member according to the present invention for practicing the image forming method of the present invention.

DETAILED DESCRIPTION OF THE INVENTION

The electrophotographic photosensitive member according to the present invention is characterized by: a photosensitive layer containing a polycarbonate having a charge-transporting group at least in a side chain (hereinafter, referred to as "charge-transporting polycarbonate"). By disposing such a photosensitive layer on an electroconductive support, it is possible to improve a charge-transporting ability of the photosensitive layer.

In the present invention, the term "charge-transporting group" means a group imparting a charge-transporting ability to a substance having the group.

The charge-transporting group may preferably have a structure in which at least one nitrogen atom is connected with at least one benzene ring. Examples of such a structure may preferable include a group having a triphenylamine structure (i.e., a group having

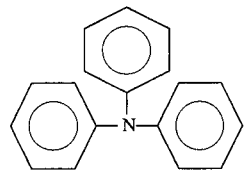

skeleton), a group having a hydrazone-structure (i.e., a group having —CH=N—N skeleton), and a group having a biphenyldiamine structure (i.e., a group having

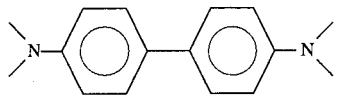

skeleton).

In the present invention, the group having a triphenylamine structure may preferably be one represented by the following formula (C):

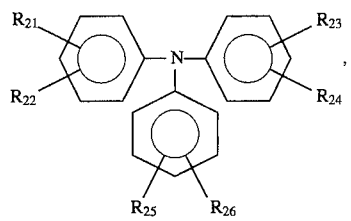

wherein at least one of $R_{21}$ to $R_{26}$ is divalent and is connected with a main chain of the above-mentioned polycarbonate by $-(CH_2)_c-$ where c is an integer of 0–5; $R_{21}$ to $R_{26}$ independently denote hydrogen, halogen, alkyl group capable of having a substituent, alkenyl group capable of having a substituent, aryl group capable of having a substituent, alkoxy group capable of having a substituent, arylamino group capable of having a substituent, arylether group capable of having a substituent, or aminoarylether group capable of having a substituent; and $R_{21}$ and $R_{22}$, $R_{23}$ and $R_24$, or $R_{25}$ and $R_{26}$ can be connected or linked with each other to form carbocycle (i.e., a ring composed of carbon atoms) or heterocycle (i.e., a ring composed of atoms of different elements).

Specific and preferred examples of the triphenylamine structure of the formula (C) may include those listed below.

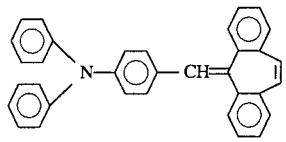

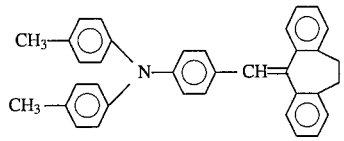

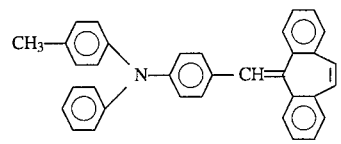

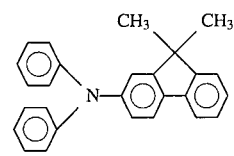

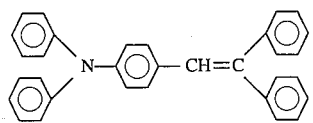

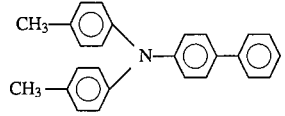

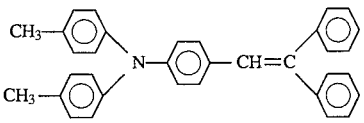

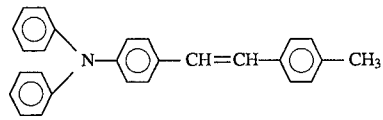

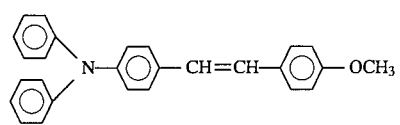

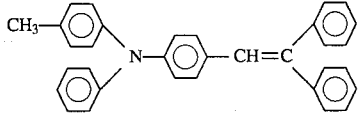

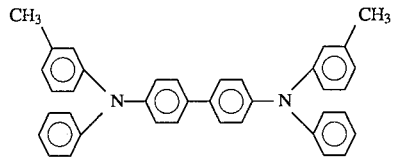

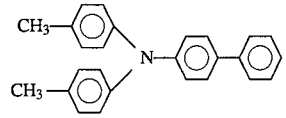

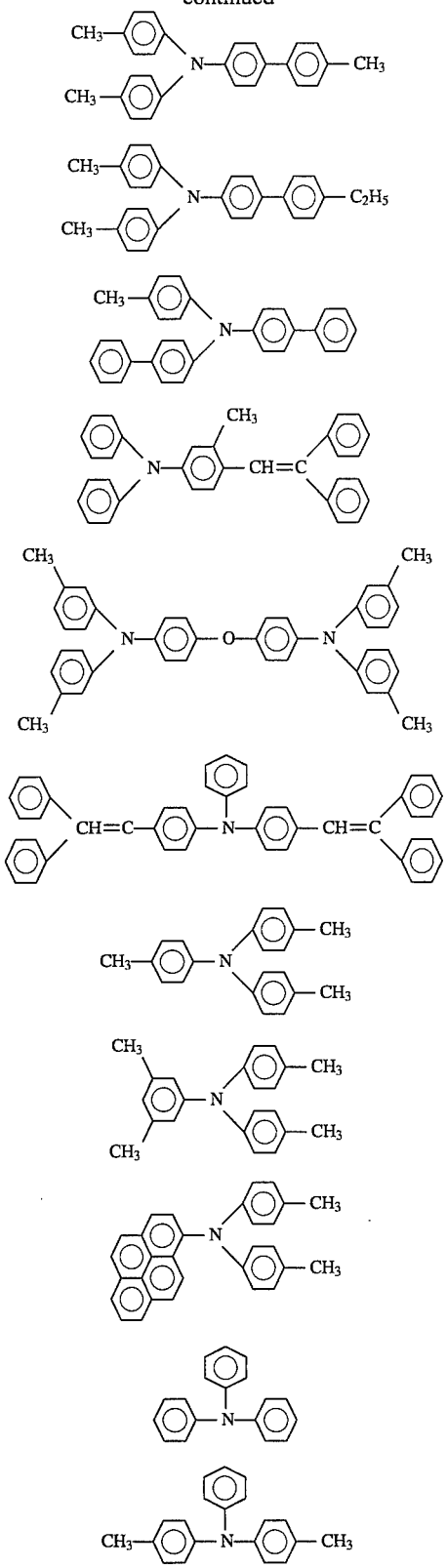

The group having a hydrazone structure may preferably be one represented by the following formula (D):

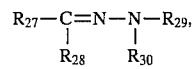

wherein at least one of $R_{27}$ to $R_{30}$ is divalent and is connected with a main chain of the above-mentioned polycarbonate by $-(CH_2)_d-$ where d is an integer of 0–5; $R_{27}$ and $R_{28}$ independently denote hydrogen, halogen, alkyl group capable of having a substituent, alkenyl group capable of having a substituent, aryl group capable of having a substituent, alkylidene group capable of having a substituent, or a univalent group containing condensed polycyclic hydrocarbon; $R_{29}$ and $R_{30}$ independently denote alkyl group capable of having a substituent, alkenyl group capable of having a substituent, aryl group capable of having a substituent, alkoxy group capable of having a substituent, alkylidene group capable of having a substituent, or a univalent group containing condensed polycyclic hydrocarbon; and at least one of $R_{29}$ and $R_{30}$ is aryl group.

Specific and preferred examples of the hydrazone structure of the formula (D) may include those listed below.

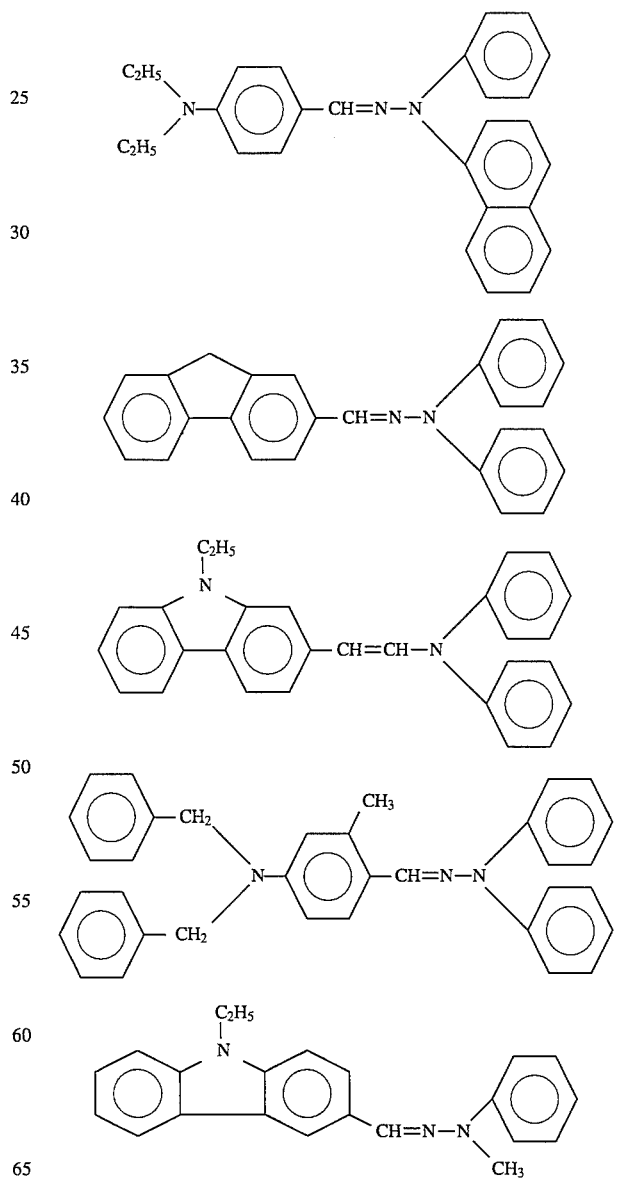

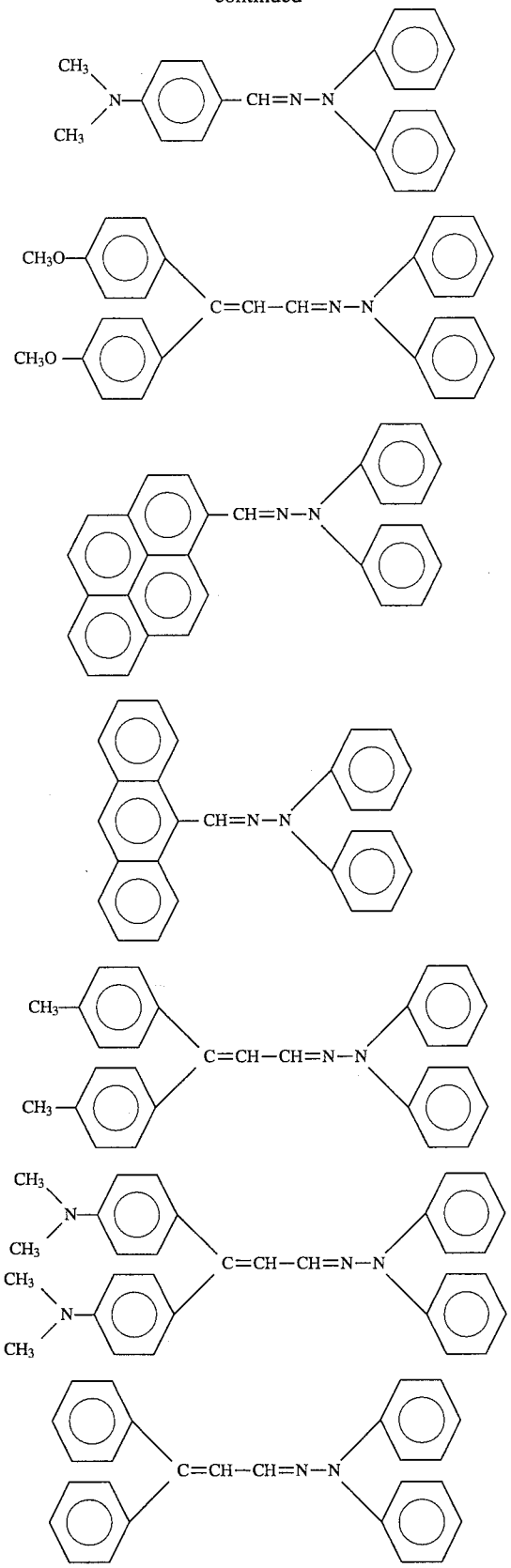
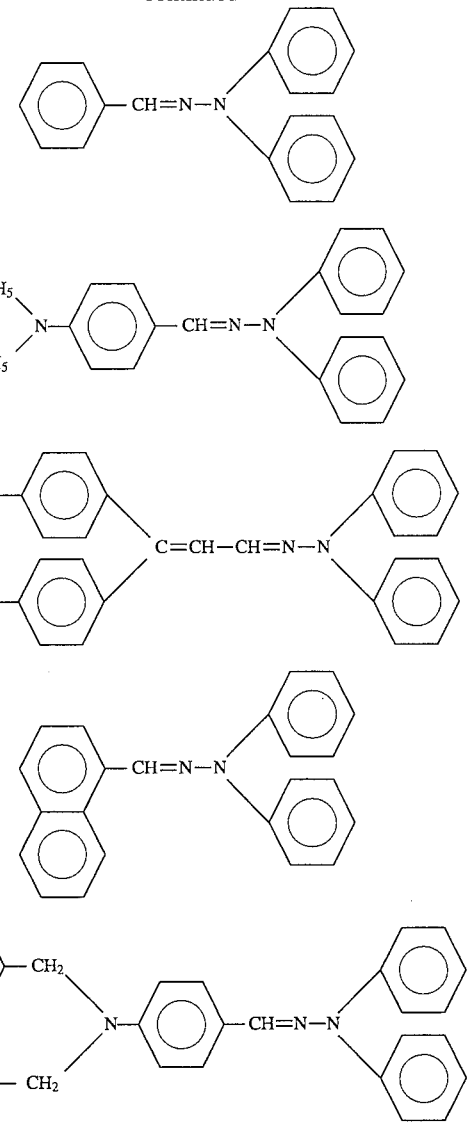

The group having a biphenyldiamine structure may preferably be one represented by the following formula (E):

$$R_{31}\diagdown N \diagup R_{32} -\!\!\!\bigcirc\!\!\!-\!\!\!\bigcirc\!\!\!- N \diagup R_{33} \diagdown R_{34} \qquad (E)$$

wherein at least one of $R_{31}$ to $R_{34}$ is divalent and is connected with a main chain of the above-mentioned polycarbonate by $-(CH_2)_e-$ where e is an integer of 0–5; $R_{31}$ and $R_{33}$ independently denote alkyl group capable of having a substituent, alkenyl group capable of having a substituent, or alkoxy group capable of having a substituent; and $R_{32}$ and $R_{34}$ independently denote alkyl group capable of having a substituent, alkenyl group capable of having a substituent, aryl group capable of having a substituent, or alkoxy group capable of having a substituent.

Specific and preferred examples of the biphenylamine structure of the formula (E) may include those listed below.

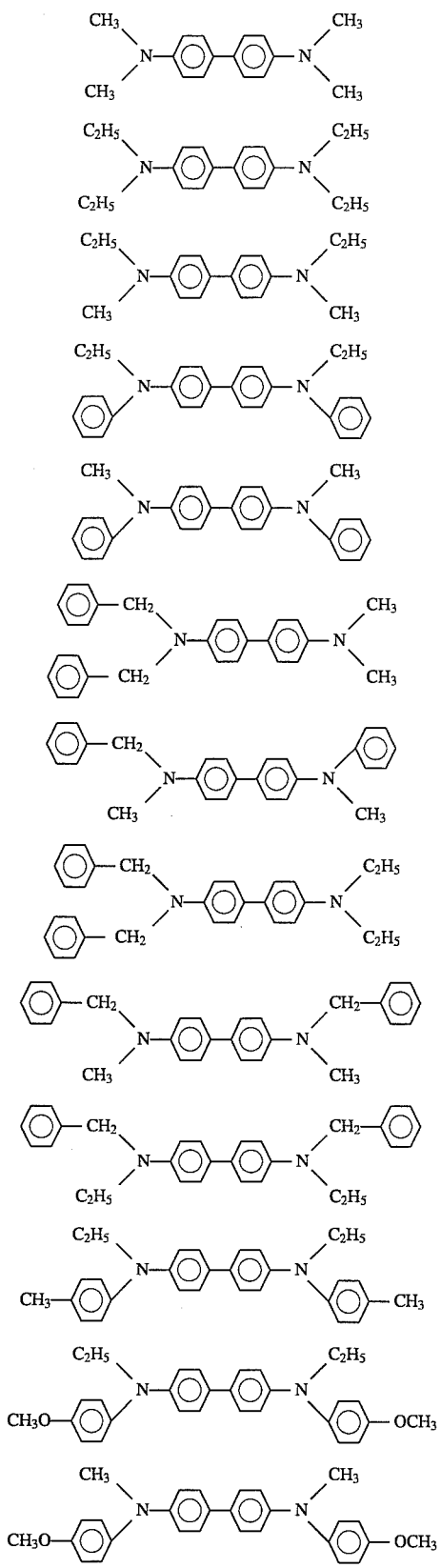

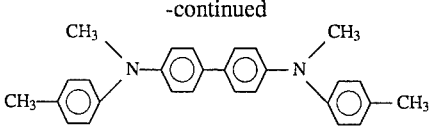

In the present invention, a charge-transporting polycarbonate may preferably have a recurring unit represented by the following formula (A):

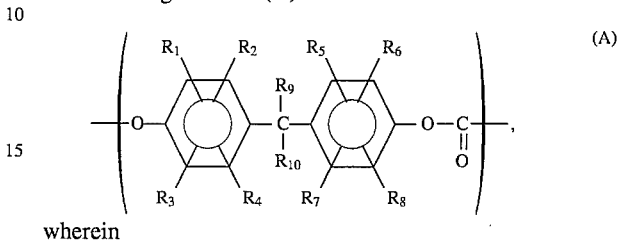

wherein $R_1$ to $R_8$ independently denote hydrogen, halogen, alkyl group capable of having a substituent, alkenyl group capable of having a substituent, alkoxy group capable of having a substituent, or aryl group capable of having a substituent;

$R_9$ and $R_{10}$ may be one selected from the group consisting of the structure of the formula (C), the structure of the formula (D) and the structure of the formula (E) described hereinabove and the other being hydrogen, alkyl group capable of having a substituent, alkenyl group capable of having a substituent, or aryl group capable of having a substituent; and both of $R_9$ and $R_{10}$ may be a group having the structure of the formula (C), the structure of the formula (D) or the structure of the formula (E).

The charge-transporting polycarbonate may preferably have the above-mentioned recurring unit of the formula (A) and a recurring unit represented by the following formula (B):

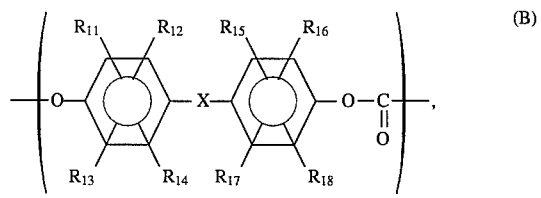

wherein $R_{11}$ to $R_{18}$ independently denote hydrogen, halogen, alkyl group capable of having a substituent, or aryl group capable of having a substituent; and X denotes

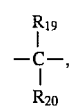

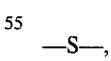,

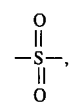

$-(CH_2)_b-$, $-O-$ or

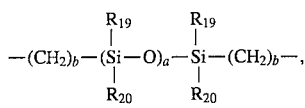

where $R_{19}$ and $R_{20}$ independently denote hydrogen, halogen, alkyl group capable of having a substituent, or aryl group capable of having a substituent; $R_{19}$ and $R_{20}$ may be connected with each other to form carbocycle or heterocycle; a is an integer of 0–2000; and b is an integer of 0–20.

In the above-mentioned formulae (A) to (E), preferred examples of $R_1$ to $R_8$, $R_{11}$ to $R_{20}$, $R_{21}$ to $R_{28}$ and $R_{29}$ to $R_{34}$ may include the following groups, respectively.

$R_1$ to $R_8$: alkyl group or alkoxy group each having 1–4 carbon atoms, chlorine or bromine.

$R_{11}$ to $R_{20}$: alkyl group having 1–4 carbon atoms, chlorine or bromine.

$R_{21}$ to $R_{28}$: alkyl group or alkoxy group each having 1–4 carbon atoms, chlorine or bromine.

$R_{29}$ to $R_{34}$: alkyl group or alkoxy group each having 1–4 carbon atoms.

Further, preferred examples of the substituents in $R_1$ to $R_{34}$ may include amino group or halogen.

The charge-transporting polycarbonate may preferably have a recurring unit of the formula (A) and a recurring unit of the formula (B) satisfying a relationship of $0<(A)/((A)+(B))\leq 1$ by mole, particularly $0.\leq(A)/((A)+(B))\leq 1$ by mole.

Specific examples of a compound suitable for providing the recurring unit of the formula (B) may include those: bis(4-hydroxyphenyl)methane; bis(4-hydroxyphenyl)ether; bis(4-hydroxyphenyl)sulfone; bis(4-hydroxyphenyl)sulfoxide; bis(4-hydroxyphenyl)sulfide; bis(4-hydroxyphenyl)ketone; 1,1-bis(4-hydroxyphenyl)ethane; 2,2-bis(4-hydroxyphenyl)propane (so-called "bisphenol A" (BPA)); 2,2-bis(4-hydroxyphenyl)butane; 1,1-bis(4-hydroxyphenyl)cyclohexane (so-called "bisphenol Z" (BPZ)); 2,2-bis(4-hydroxy-3,5-dibromophenyl)propane; 2,2-bis(4-hydroxy-3-dichlorophenyl)propane; 2,2-bis(4-hydroxy-3-bromophenyl)propane; 2,2-bis(4-hydroxy-3-chlorophenyl)propane; 2,2-bis(4-hydroxy-3-methylphenyl)propane; 2,2-bis(4-hydroxy-3,5-dimethylphenyl)propane; 1,1-bis(4-hydroxyphenyl)-1-phenylethane; bis(4-hydroxyphenyl)diphenylmethane; and α,ω-bis[3-(o-hydroxyphenyl)propyl]polydimethylsiloxane.

The charge-transporting polycarbonate used in the photosensitive member according to the present invention may preferably have a weight-average molecular weight (Mw) of 1,000–1,000,000, more preferably 2,000–700,000, as measured by GPC (gel permeation chromatography) method.

Hereinbelow, synthesis examples of the charge-transporting polycarbonate used in the present invention will be explained.

Synthesis Example 1

In 580 ml of 8.8% (w/v)-NaOH (sodium hydroxide) aqueous solution, 188.4 g of a dihydric phenol of the formula (1) below and 0.1 g of hydrosulfite were added and dissolved.

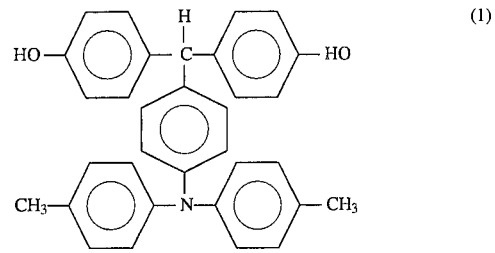

To the solution, 360 ml of methylene chloride was added. Under stirring at 15° C., 2.0 g of p-t-butylphenol (PTBP) was added to the mixture and 51 g of phosgene was blown into the resultant mixture in 60 minutes, followed by vigorous stirring to emulsify the reaction liquid. To the resultant emulsion, 0.2 ml of triethylamine was added, followed by stirring for about 1 hour to effect polymerization. The polymerization mixture was separated into a water layer and an organic layer. The organic layer was neutralized with phosphoric acid and repetitively washed with water until the washing showed neutrality, followed by addition of 470 ml of isopropanol to effect precipitation of the polymerization product. The precipitate was recovered by filtration and dried to obtain a power polymerization product.

The polymerization product showed a limiting viscosity number (or intrinsic viscosity) [η] of 0.46 dl/g. Herein, the limiting viscosity number [η] is measured at 20° C. by using a 0.5 (g/dl)-solution of a sample polymer in methylene chloride.

The polymerization product was subjected to infrared absorption spectroscopy. As a result, it was confirmed that the polymerization product had carbonate bond since the product showed an absorption peak (or line) derived from carbonyl group in the position of 1650 cm$^{-1}$ and an absorption peak derived from ether bond in the position of 1240 cm$^{-1}$. Further, the polymerization product showed substantially no absorption peak derived from hydroxyl group in the position of 3650–3200 cm$^{-1}$.

Thus, the polymerization product was identified as a polycarbonate having the following recurring unit.

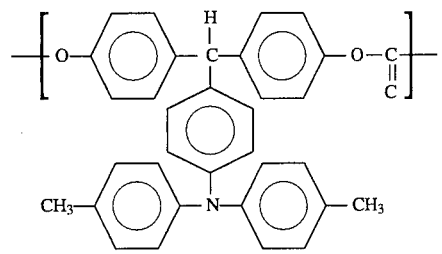

Synthesis Example 2

A polycarbonate was prepared in the same manner as in Synthesis Example 1 except that 199.6 g of a dihydric phenol of the formula (2) below was used instead of the dihydric phenol of the formula (1).

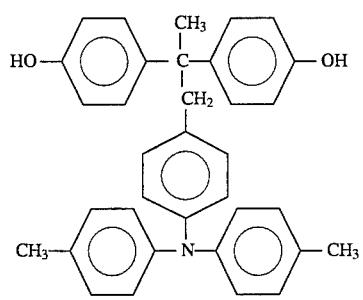

(2)

The polymerization product had a limiting viscosity number [η] of 0.46 dl/g and was identified as a polycarbonate having the following recurring unit by infrared absorption spectroscopy.

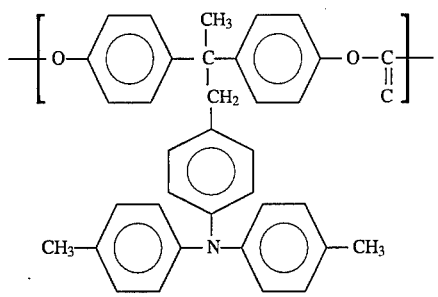

Synthesis Example 3

A polycarbonate was prepared in the same manner as in Synthesis Example 1 except that 194 g of a dihydric phenol of the formula (3) below was used instead of the dihydric phenol of the formula (1).

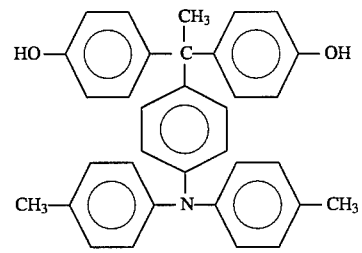

(3)

The polymerization product had a limiting viscosity number [η] of 0.46 dl/g and was identified as a polycarbonate having the following recurring unit by infrared absorption spectroscopy.

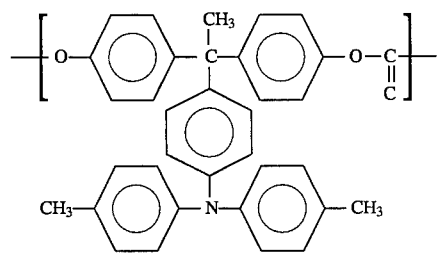

Synthesis Example 4

A polycarbonate was prepared in the same manner as in Synthesis Example 1 except that 205.2 g of a dihydric phenol of the formula (4) below was used instead of the dihydric phenol of the formula (1).

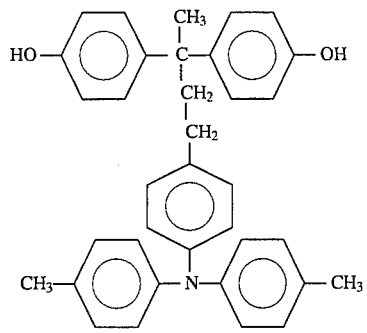

(4)

The polymerization product had a limiting viscosity number [η] of 0.46 dl/g and was identified as a polycarbonate having the following recurring unit by infrared absorption spectroscopy.

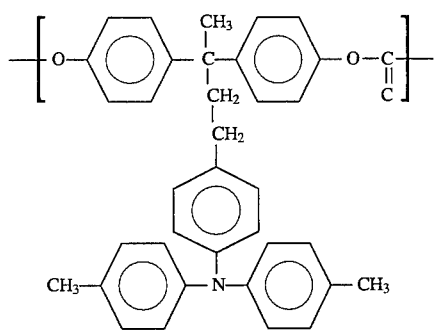

Synthesis Example 5

A polycarbonate was prepared in the same manner as in Synthesis Example 1 except that 308 g of a dihydric phenol of the formula (5) below was used instead of the dihydric phenol of the formula (1).

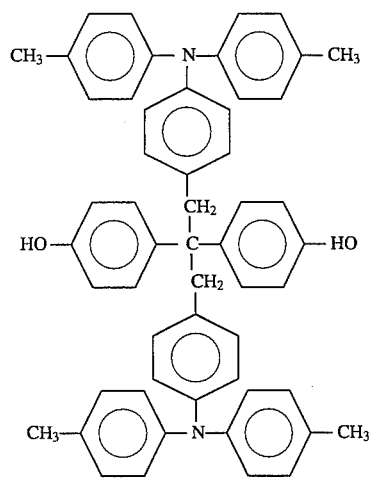

(5)

The polymerization product had a limiting viscosity number [η] of 0.46 dl/g and was identified as a polycarbonate having the following recurring unit by infrared absorption spectroscopy.

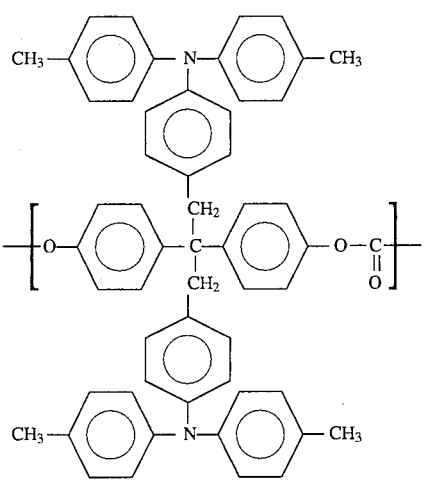

Synthesis Example 6

A polycarbonate was prepared in the same manner as in Synthesis Example 1 except that 99.8 g of a dihydric phenol of the formula (2) described above and 45.6 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

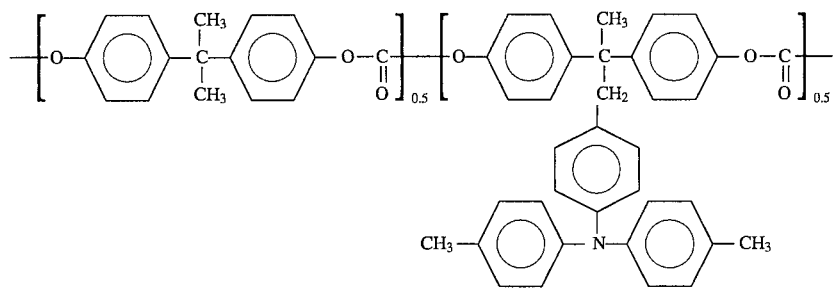

Synthesis Example 7

A polycarbonate was prepared in the same manner as in Synthesis Example 1 except that 20.0 g of a dihydric phenol of the formula (2) described above and 82.1 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

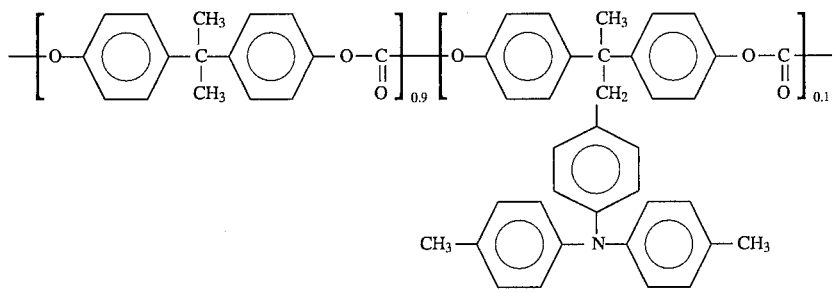

Synthesis Example 8

A polycarbonate was prepared in the same manner as in Synthesis Example 1 except that 59.9 g of a dihydric phenol of the formula (2) described above and 63.8 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

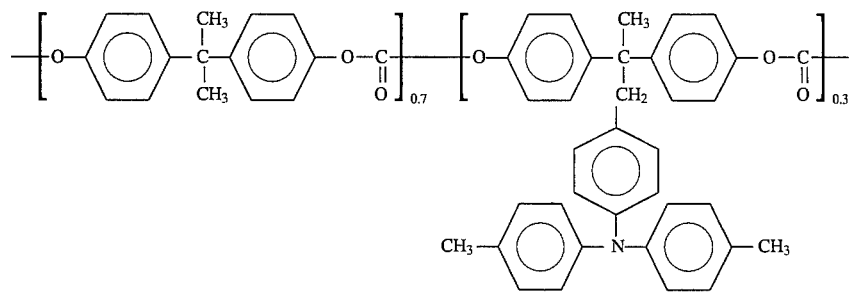

Synthesis Example 9

A polycarbonate was prepared in the same manner as in Synthesis Example 1 except that 188 g of a dihydric phenol of the formula (6) below was used instead of the dihydric phenol of the formula (1).

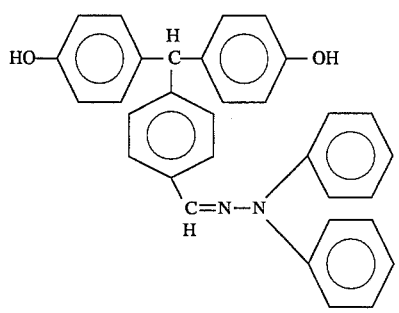

The polymerization product had a limiting viscosity number [η] of 0.46 dl/g and was identified as a polycarbonate having the following recurring unit by infrared absorption spectroscopy.

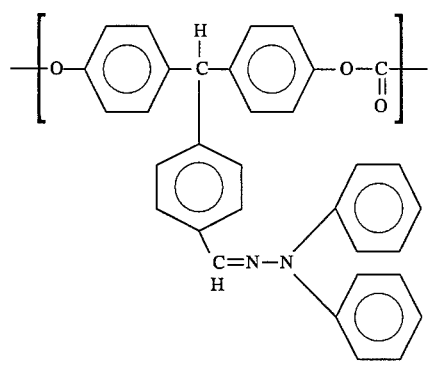

Synthesis Example 10

A polycarbonate was prepared in the same manner as in Synthesis Example 1 except that 236.4 g of a dihydric phenol of the formula (7) below was used instead of the dihydric phenol of the formula (1).

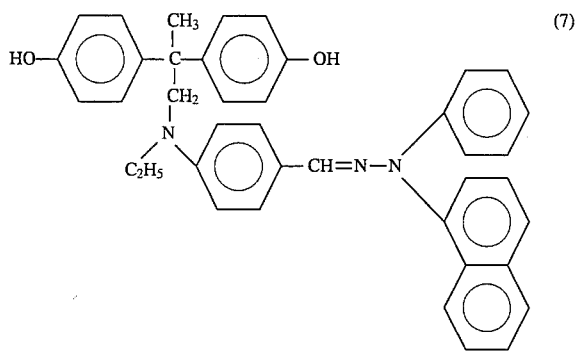

The polymerization product had a limiting viscosity number [η] of 0.47 dl/g and was identified as a polycarbonate having the following recurring unit by infrared absorption spectroscopy.

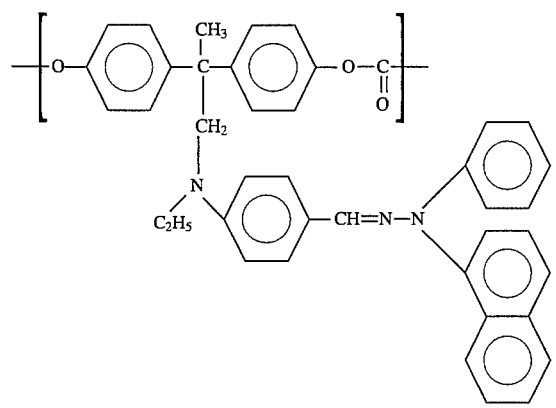

Synthesis Example 11

A polycarbonate was prepared in the same manner as in Synthesis Example 1 except that 94 g of a dihydric phenol of the formula (6) described above and 45.6 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

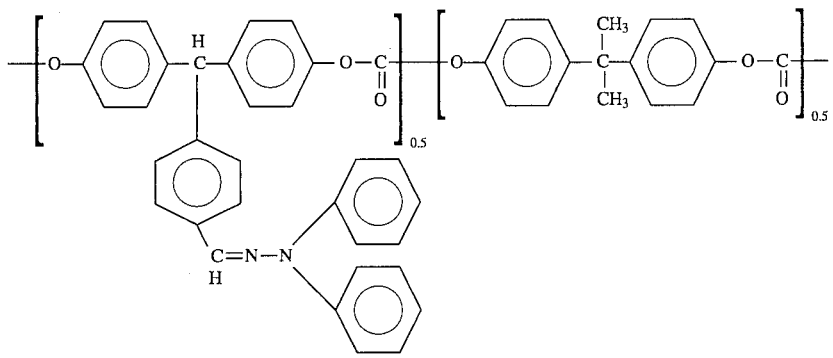

Synthesis Example 12

A polycarbonate was prepared in the same manner as in Synthesis Example 1 except that 18.8 g of a dihydric phenol of the formula (6) described above and 82.1 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

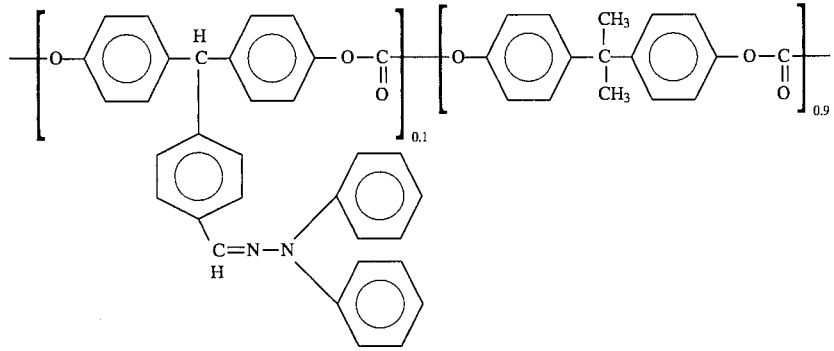

Synthesis Example 13

A polycarbonate was prepared in the same manner as in Synthesis Example 1 except that 56.4 g of a dihydric phenol of the formula (6) described above and 63.8 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

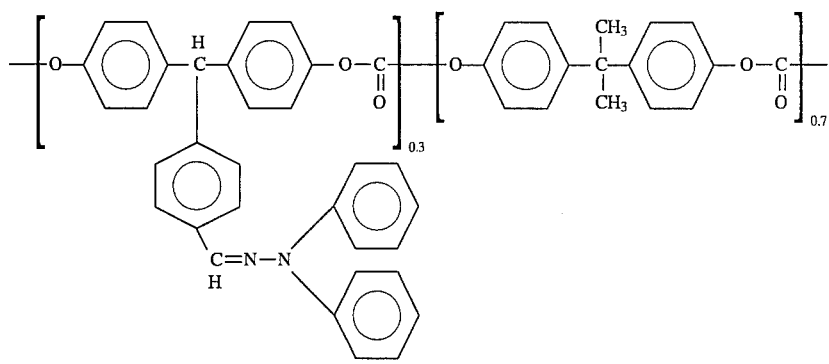

Synthesis Example 14

A polycarbonate was prepared in the same manner as in Synthesis Example 1 except that 197.6 g of a dihydric phenol of the formula (8) below was used instead of the dihydric phenol of the formula (1).

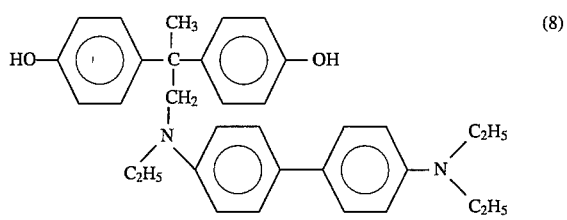

The polymerization product had a limiting viscosity number [η] of 0.47 dl/g and was identified as a polycarbonate having the following recurring unit by infrared absorption spectroscopy.

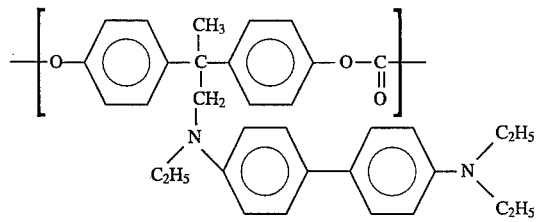

Synthesis Example 15

A polycarbonate was prepared in the same manner as in Synthesis Example 1 except that 236 g of a dihydric phenol of the formula (9) below was used instead of the dihydric phenol of the formula (1).

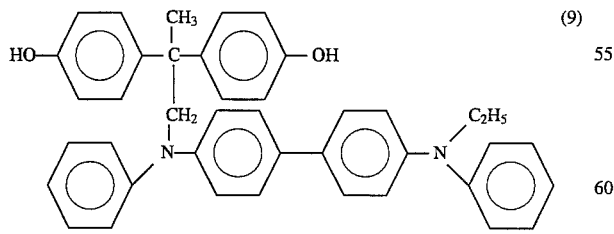

The polymerization product had a limiting viscosity number [η] of 0.47 dl/g and was identified as a polycarbonate having the following recurring unit by infrared absorption spectroscopy.

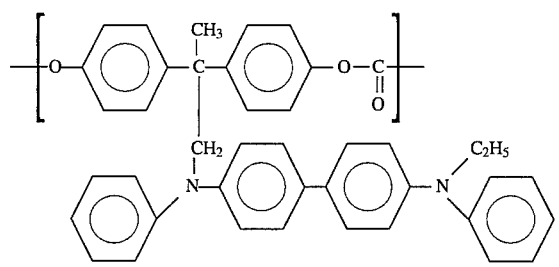

Synthesis Example 16

A polycarbonate was prepared in the same manner as in Synthesis Example 1 except that 98.8 g of a dihydric phenol of the formula (8) described above and 45.6 g of bisphenol A were used instead of the dihydric phenol of the formula (1), The polymerization product had a limiting viscosity number [η] of 0.46 dl/g and was identified as a polycarbonate having the following recurring unit by infrared absorption spectroscopy.

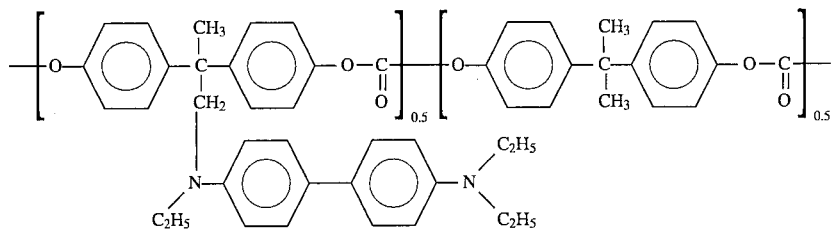

Synthesis Example 17

A polycarbonate was prepared in the same manner as in Synthesis Example 1 except that 23.6 g of a dihydric phenol of the formula (9) described above and 82.1 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

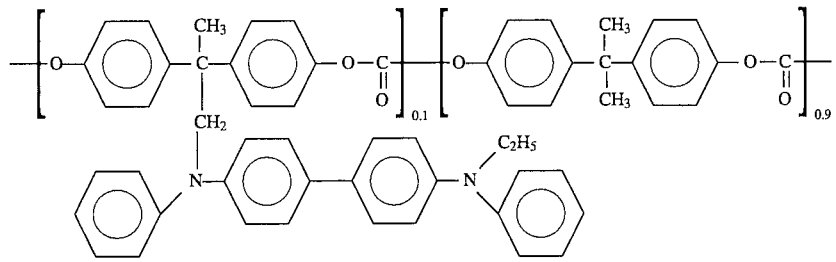

Synthesis Example 18

A polycarbonate was prepared in the same manner as in Synthesis Example 1 except that 70.8 g of a dihydric phenol of the formula (9) described above and 63.8 g of bisphenol A were used instead of the dihydric phenol of the formula (1).

The polymerization product had a limiting viscosity number [η] of 0.46 dl/g and was identified as a polycarbonate having the following recurring unit by infrared absorption spectroscopy.

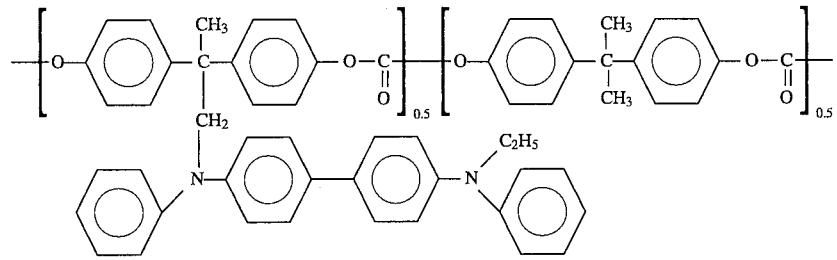

The electrophotographic photosensitive member according to the present invention includes a photosensitive layer comprising the above-mentioned charge-transporting polycarbonate and an appropriate charge-generating material.

The photosensitive layer of the electrophotographic photosensitive member of the present invention may, e.g., include the following layer structures:

(I) A laminated structure comprising a lower layer containing a charge-generating material and an upper layer containing a charge-transporting material successively disposed on a support (or an electroconductive support);

(II) A laminated structure comprising a lower layer containing a charge-transporting material and an upper layer containing a charge-generating material successively disposed on a support;

(III) A single layer structure containing a charge-generating material and a charge-transporting material; and (IV) A laminated structure comprising a lower layer containing a charge-generating material and an upper layer containing a charge-generating material and a charge-transporting material.

The charge-transporting polycarbonate used in the present invention has a high hole-transporting ability and accordingly may preferably be used as a charge-transporting material contained in the above photosensitive layer having the structures of (I) to (IV). A polarity of a primary charge for use in a charging step of the photosensitive member of the present invention may preferably be negative for the structure (I), positive for the structure (II) and negative or positive for the structures (III) and (IV).

In the present invention, the photosensitive member may comprise a protective layer and/or an insulating layer disposed on the surface of a photosensitive layer for improving adhesive properties and/or controlling charge injection properties. It is also possible to dispose a undercoating layer (or a primary layer) between a photosensitive layer and an electroconductive support for controlling charge injection properties.

The photosensitive member of the present invention may preferably contain a photosensitive layer having the above-mentioned layer structure (I). Hereinbelow, the photosensitive member containing such a photosensitive layer will be explained by way of preferred embodiment.

The photosensitive member comprises an electroconductive support, a charge generation layer (CGL) containing a charge-generating material (CGM), a charge transport layer (CTL) containing a charge-transporting material (CTM) in this order and optionally comprises the above-mentioned undercoating layer, insulating layer and/or protective layer. The CGL and the CTL constitute a photosensitive layer as a whole.

The electroconductive support may include:

(i) A metal or an alloy such as aluminum, aluminum alloy, stainless steel or copper in the form of a plate or a drum (or a cylinder);

(ii) A laminated or vapor-deposited support comprising a non-electroconductive substance such as glass, a resin or paper, or the above support (i) each having thereon a layer of a metal or an alloy such as aluminum, aluminum alloy, palladium, rhodium, gold or platinum; and (iii) A coated or vapor-deposited support comprising a non-electroconductive substance such as glass, a resin or paper, or the above support (i) each having thereon a layer of an electroconductive substance such as an electroconductive polymer, tin oxide or indium oxide.

The CGM contained in the CGL may include:

(i) Azo pigments of monoazo-type, bisazo-type, trisazo-type, etc.;

(ii) Phthalocyanine pigments such as metallophthalocyanine and non-metallophthalocyanine;

(iii) Indigo pigments such as indigo and thioindigo;

(iv) Perylene pigments such as perylenic anhydride and perylenimide;

(v) Polycyclic quinones such as anthraquinone and pyrene-1,8-quinone;

(vi) Squalium colorant;

(vii) Pyrilium salts and thiopyrilium salts;

(viii) Triphenylmethane-type colorants; and (ix) Inorganic substances such as selenium and amorphous silicon.

The above CGM may be used singly or in combination of two or more species.

In the present invention, azo pigments (i) and phthalocyanine pigments (ii) may preferably be used as the CGM.

In the present invention, the CGL may be formed on the electroconductive support by vapor-deposition, sputtering or chemical vapor deposition (CVD), or by dispersing or dissolving the CGM in an appropriate solvent together with a binder resin and applying the resultant coating liquid onto the electroconductive support by means of a known coating method such as dipping, spinner coating, roller coating, wire bar coating, spray coating or blade coating and then drying the coating. Examples of the binder resin used may be selected from various known resins such as polycarbonate resin, polyester resin, polyarylate resin, polyvinyl butyral resin, polystyrene resin, polyvinyl acetal resin, diallylphthalate resin, acrylic resin, methacrylic resin, vinyl acetate resin, phenoxy resin, silicone resin, polysulfone resin, styrene-butadiene copolymer, alkyd resin, epoxy resin, urea resin and vinyl chloride-vinyl acetate copolymer. These binder resins may be used singly or in combination of two or more species. When the photosensitive layer has a single layer structure, the CGL may preferably contain 20–70 wt. %, particularly 30–50 wt. %, of the binder resin. When the photosensitive layer has a laminated structure, the CGL may preferably contain 20–100 wt. %, particularly 50–100 wt. %, of the binder resin.

Examples of the solvent used may be selected from those dissolving the above-mentioned binder resin and may preferably include: ethers, ketones, amines, esters, aromatic compounds, alcohols, and aliphatic halogenated hydrocarbons. The CGL may contain one or more known sensitizing agent, as desired.

The CGL may preferably have a thickness of at most 5 µm, particularly 0.01 to 2 µm.

The CTL according to the present invention may preferably be formed by dispersing or dissolving the above-mentioned charge-transporting polycarbonate alone or the charge-transporting polycarbonate and another charge-transporting material in, if necessary, an appropriate solvent together with a binder resin, applying the resultant coating liquid such as solution onto a predetermined surface (e.g., the surface of an electroconductive substrate, charge generation layer, etc.) by the above-mentioned coating method, and then drying the resultant coating.

Examples of the binder resin to be used for forming the CTL may include: the resins used for the CGL described above: and organic photoconductive polymers such as poly-N-vinylcarbazole and polyvinylanthracene.

Examples of another charge-transporting material may include triphenylamine compounds, hydrazone compounds and carbazole compounds.

The CTL and the CGL are electrically connected each other. Accordingly, the CTM contained in the CTL has functions of receiving charge carriers generated in the CGL and transporting the charge carries from the CGL to the surface of the photosensitive layer under electric field application.

The CTL may preferably have a thickness of 5 to 40 µm, particularly 10 to 30 µm, in view of a charge-transporting ability of the CTM since the CTM fails to transport the charge carries when a thickness of the CTL is too large. When the photosensitive layer has a single layer structure, the CTL may preferably contain 30–80 wt. %, more preferably 50–70 wt. %, of the CTM comprising the charge-transporting polycarbonate. When the photosensitive layer has a laminated structure, the CTL may preferably contain 30–100 wt. %, more preferably 50–100 wt. % of the CTM comprising the charge-transporting polycarbonate.

The CTL may contain further additives such as an antioxidant, an ultraviolet absorbing agent, and a plasticizer, as desired.

In a case where a photosensitive layer has a single layer structure (i.e., the above-mentioned structure (III)), the photosensitive layer may preferably have a thickness of 5 to 40 µm, particularly 10 to 30 µm.

The electrophotographic photosensitive member according to the present invention can be applied to not only an ordinary electrophotographic copying machine but also a facsimile machine, a laser beam printer, a light-emitting diode (LED) printer, a cathode-ray tube (CRT) printer, a liquid crystal printer, and other fields of applied electrophotography including, e.g., laser plate making.

Hereinbelow, the image forming method using the photosensitive member according to the present invention will be explained.

The sole FIGURE shows a schematic structural view of an electrophotographic apparatus using an electrophotographic photosensitive member of the invention. Referring to the FIGURE, a photosensitive drum (i.e., photosensitive member) 1 according to the present invention is rotated about an axis 1a at a prescribed peripheral speed in the direction of the arrow shown inside of the photosensitive drum 1. The surface of the photosensitive drum is uniformly charged by means of a charger 2 to have a prescribed positive or negative potential in a step of charging. The photosensitive drum 1 is image-exposed to light L (as by slit exposure or laser beam-scanning exposure) by using an image exposure means (not shown) in a step of image-exposure, whereby an electrostatic latent image corresponding to an exposure image is successively formed on the surface of the photosensitive drum 1. The electrostatic latent image is developed by a developing means 3 to form a toner image in a step of developing. The toner image is successively transferred to a recording material P which is supplied from a supply part (not shown) to a position between the photosensitive drum 1 and a transfer charger 4 in synchronism with the rotating speed of the photosensitive drum 1, by means of the transfer charger 4. The recording material P with the toner image thereon is separated from the photosensitive drum 1 to be conveyed to a fixing device 7, followed by image fixing to print out the transfer material P as a copy outside the electrophotographic apparatus. Residual toner particles on the surface of the photosensitive drum 1 after the transfer are removed by means of a cleaner 5 to provide a cleaned surface, and residual charge on the surface of the photosensitive drum 1 is erased by a pre-exposure means 6 to prepare for the next cycle. As the charger 2 for charging the photosensitive drum 1 uniformly, a corona charger is widely used in general. As the transfer charger 4, such a corona charger is also widely used in general.

In the electrophotographic apparatus, it is possible to provide a device unit which includes plural means inclusive of or selected from the photosensitive member (photosensitive drum), the charger, the developing means, the cleaner, etc. so as to be attached or removed as desired. The device unit may, for example, be composed of the photosensitive member and at least one device of the charger, the developing means and the cleaner to prepare a single unit capable of being attached to or removed from the body of the electrophotographic apparatus by using a guiding means such as a rail in the body.

In case where the electrophotographic apparatus is used as a copying machine or a printer, image-exposure light L may be performed by reading a data on reflection light or transmitted light from an original or by reading on the original by means of a sensor, converting the data into a signal and then effecting a laser beam scanning, a drive of LED array or a drive of a liquid crystal shutter array so as to expose the photosensitive member to light L.

Hereinbelow, tile present invention, will be explained more specifically with reference to examples.

Example 1

A coating liquid for a charge generation layer (CGL) was prepared by adding 10 g of a bisazo pigment of the formula:

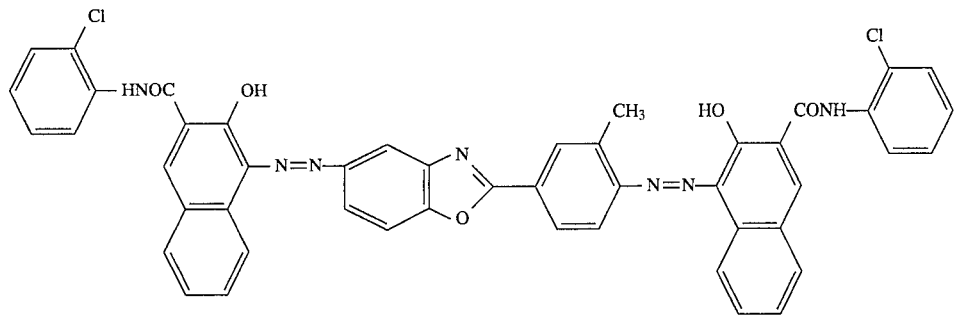

to a solution of 5 g of a butyral resin (butyral degree of 67 mol. %) in 300 ml of cyclohexanone and dispersing for 15 hours by means of a sand mill.

The coating liquid for the CGL was applied onto a 50 μm-thick aluminum sheet by a wire bar and dried to obtain a 0.2 μm-thick CGL.

Then, 10 g of a charge-transporting polycarbonate prepared in Synthesis Example 1 (weight-average molecular weight (Mw=25,000) was dissolved in 70 g of monochlorobenzene to prepare a coating liquid.

The coating liquid was applied onto the above-prepared CGL by means of a wire bar, followed by drying to form a charge transport layer (CTL) having a thickness of 21 microns, whereby an electrophotographic photosensitive member was prepared.

The thus prepared photosensitive member was cut to prepare a test sample (50 mm×50 mm square) for charging characteristics. The test example was negatively charged by using corona (−5 KV) according to a static method by means of an electrostatic. copying paper tester (Model: EPA-8100, mfd. by Kawaguchi Denki K.K.) and retained in a dark place for 1 sec. Thereafter, the photosensitive member was exposed to light at an illuminance of 10 lux to evaluate charging characteristics. More specifically, the charging characteristics were evaluated by measuring a surface potential ($V_0$) at an initial stage, a surface potential ($V_1$) obtained after a dark decay for 1 sec, and the exposure quantity ($E_{1/2}$:lux.sec) (i.e., sensitivity) required for decreasing the potential $V_1$ to ½ thereof. The results are shown in Table 1 appearing hereinafter.

In order to evaluate fluctuations of a light part potential ($V_L$) and a dark part potential ($V_D$) in repetitive use, the above photosensitive member was attached to a cylinder for a photosensitive drum of a plane paper copying machine (PPC) NP-3825 (manufactured by Canon K.K.) and subjected to a copying test (or a durability test) of 10,000 sheets on condition that $V_D$ and $V_L$ at an initial stage were set to −700 V and −300 V, respectively. After the copying test of 10,000 sheets, $V_D$ and $V_L$ were measured to evaluate the fluctuations of $V_D$ and $V_L$, respectively, in comparison with those at the initial stage.

The results are shown in Table 1.

TABLE 1

| | | | | Initial | | After 10,000 sheets | |
|---|---|---|---|---|---|---|---|
| Ex. | $V_0$ (–V) | $V_1$ (–V) | $E_{1/2}$ (lux · sec) | $V_D$ (–V) | $V_L$ (–V) | $V_D$ (–V) | $V_L$ (–V) |
| 1 | 650 | 640 | 2.7 | 700 | 300 | 680 | 315 |

Examples 2–4

Three electrophotographic photosensitive members were prepared and evaluated in the same manner as in Example 1 except that the charge-transporting polycarbonate prepared in Synthesis Example 1 was changed to those prepared in Synthesis Examples 2–4 (for Examples 2–4), respectively, and that the CGM was changed to a CGM of the following formula:

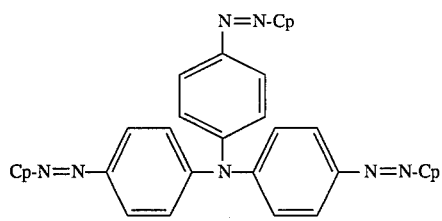

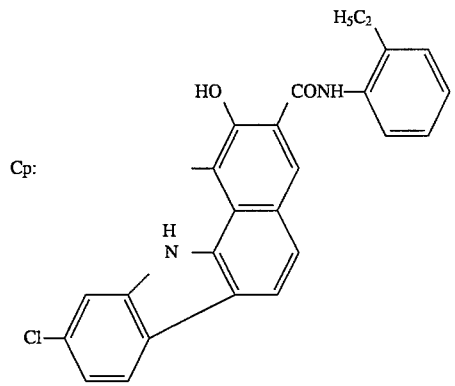

The three charge-transporting polycarbonates used in Examples 2–4 had an Mw of 25,000.

The results are shown in Table 2 appearing below.

Comparative Example 1

A coating liquid for a CTL was prepared by dissolving 14 g of CTM having the formula shown below and 20 g of a polycarbonate A resin (bisphenol A-type; Mw=25,000) in 70 g of monochlorobenzene.

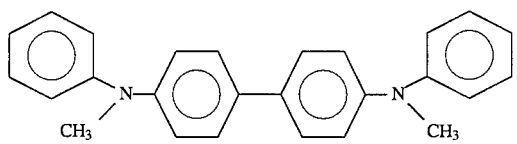

A photosensitive member was prepared in the same manner as in Example 1 except for using the above-prepared coating liquid. The thus-prepared CTL had a thickness of 20 μm after drying.

The photosensitive member was evaluated in the same manner as in Example 1. The results are shown in Table 2.

Comparative Example 2

A photosensitive member was prepared in the same manner as in Comparative Example 1 except that the CTM was changed to a CTM having the following formula:

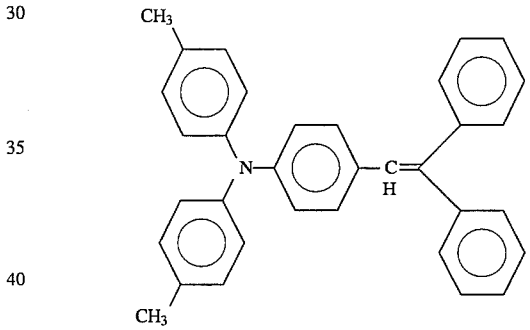

The photosensitive member was evaluated in the same manner as in Example 1. The results are shown in Table 2.

Example 5

A coating liquid for a CGL was prepared by adding 12 g of a bisazo pigment of the formula:

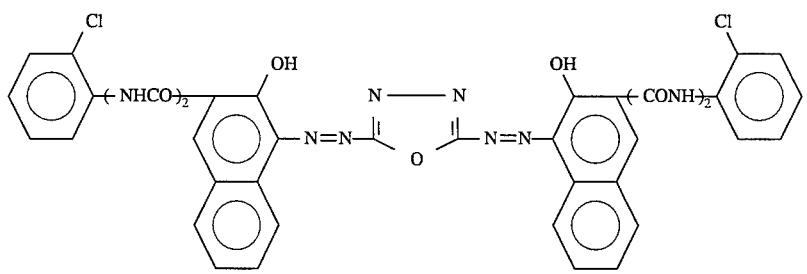

to a solution of 5 g of a butyral resin (butyral degree of 70 mol.%) in 280 ml of cyclohexanone and dispersing for 25 hours by means of a sand mill.

The coating liquid for the CGL was applied onto a 50 μm-thick aluminum sheet by a wire bar and dried to obtain a 0.2 μm-thick CGL.

Then, 15 g of a charge-transporting polycarbonate prepared in Synthesis Example 1 (Mw=25,000) and 7 g of a polycarbonate Z resin (Mw=20,000) of the formula shown below were dissolved in 80 g of mono-chlorobenzene to prepare a coating liquid.

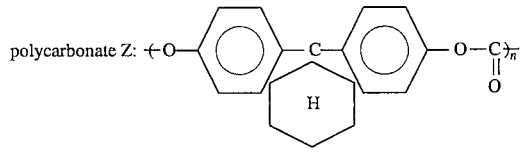

The coating liquid was applied onto the above-prepared CGL by means of a wire bar, followed by drying to form a CTL having a thickness of 25 microns, whereby an electrophotographic photosensitive member was prepared.

The thus prepared photosensitive member was evaluated in the same manner as in Example 1. The results are shown in Table 2.

Example 6

A coating liquid for a CGL was prepared by adding 12 g of a bisazo pigment of the formula:

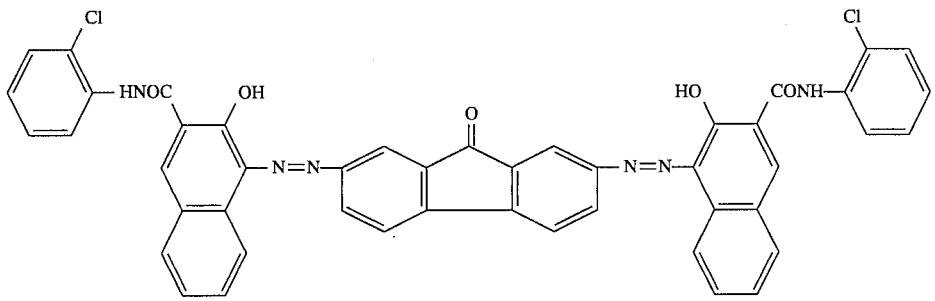

to a solution of 5 g of a butyral resin (butyral degree of 75 mol. %) in 200 ml of cyclohexanone and dispersing for 30 hours by means of a sand mill.

The coating liquid for the CGL was applied onto a 50 μm-thick aluminum sheet by a wire bar and dried to obtain a 0.4 μm-thick CGL.

Then, 20 g of a charge-transporting polycarbonate prepared in Synthesis Example 4 and 5 g of a triphenylamine compound of the formula shown below were dissolved in 70 g of mono-chlorobenzene to prepare a coating liquid.

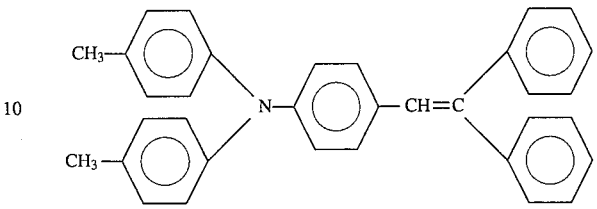

The coating liquid was applied onto the above-prepared CGL by means of a wire bar, followed by drying to form a CTL having a thickness of 22 microns, whereby an electrophotographic photosensitive member was prepared.

The thus prepared photosensitive member was evaluated in the same manner as in Example 1. The results are shown in Table 2 below.

TABLE 2

| | $V_0$ (-V) | $V_1$ (-V) | $E_{(1/2)}$ (lux · sec) | Initial | | After 10,000 sheets | |
|---|---|---|---|---|---|---|---|
| | | | | $V_D$ (-V) | $V_L$ (-V) | $V_D$ (-V) | $V_L$ (-V) |
| Ex. | | | | | | | |
| 1 | 640 | 630 | 1.6 | 700 | 300 | 670 | 350 |
| 2 | 650 | 630 | 1.7 | 700 | 300 | 680 | 340 |
| 4 | 630 | 615 | 1.4 | 700 | 300 | 680 | 315 |
| 5 | 650 | 635 | 2.5 | 700 | 300 | 670 | 340 |
| 6 | 640 | 630 | 2.1 | 700 | 300 | 675 | 325 |
| Comp. Ex. | | | | | | | |
| 1 | 620 | 590 | 3.5 | 700 | 300 | 590 | 450 |
| 2 | 630 | 600 | 4.7 | 700 | 300 | 610 | 440 |

As apparent from Tables 1 and 2, the photosensitive members according to the present invention provided a high photosensitivity (i.e., a low $E_{1/2}$) and an excellent potential stability (i.e., a decreased fluctuations of $V_D$ and $V_L$) when repetitively used, compared with those used in Comparative Examples 1 and 2.

Example 7

Onto the peripheral surface of an aluminum cylinder (outer diameter of 30 mm), a solution of 10 g of an N-methoxymethylated 6-nylon resin (Mw=5,000) and 5 g of an alcohol-soluble copolymer nylon resin (Mw=7,000) in 250 g of methanol was applied by means of a wire bar, followed by drying to form a 1 micron-thick undercoating layer.

A coating liquid for a CGL was prepared by dispersing 5 g of a CGM having the formula shown below, 2 g of a butyral resin (butyral degree of 70%; Mw=4,000) and 100 g of dioxane for 24 hours by means of a ball mill. The coating liquid was applied onto the undercoating layer by blade coating and dried to form a 0.4 μm-thick CGL.

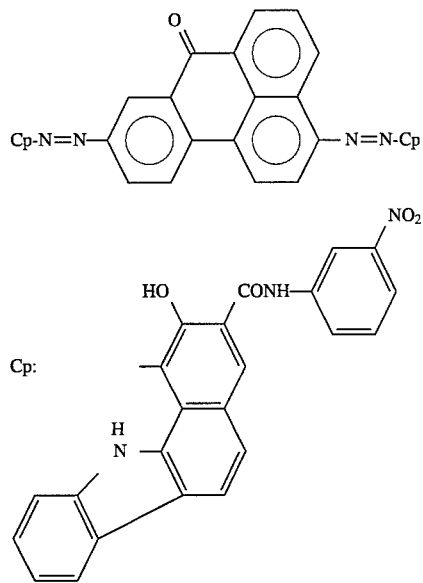

Then, 15 g of a charge-transporting polycarbonate prepared in Synthesis Example 6 (Mw=27,000) was dissolved in 60 g of monochlorobenzene. The solution was applied onto the CGL by blade coating and dried to form 27 microns-thick CTL, whereby an electrophotographic photosensitive member was obtained.

The thus prepared photosensitive member was charged by corona discharge (−5 KV) so as to have an initial potential of $V_0$, left standing in a dark place for 1 sec, and thereafter the surface potential thereof ($V_1$) was measured. In order to evaluate the sensitivity, the exposure quantity ($E_{1/2}$, μJ/cm$^2$) required for decreasing the potential $V_1$ after the dark decay to ½ thereof was measured. The light source used at this time was laser light (output: 5 mW, emission wavelength: 780 nm) emitted from a ternary semiconductor comprising gallium/aluminum/arsenic.

The results were as follows:
$V_0$: −650 V
$V_1$: −640 V
$E_{1/2}$: 1.1 μJ/cm$^2$ The above-mentioned photosensitive member was assembled in a laser beam printer (trade name: LBP-CX, mfd. by Canon K.K.) as an electrophotographic printer equipped with the above-mentioned semiconductor laser using a reversal development system, and subjected to image formation.

The image formation conditions used herein were as follows:
surface potential after primary charging: −700 V
surface potential after image exposure: −200 V (exposure quantity of 2.8 μJ/cm$^2$)
transfer potential: +700 V
polarity of developing: negative
process speed: 50 mm/sec
developing condition (developing bias): −450 V
image exposure scanning system: image scan
exposure prior to the primary charging: 15 lux.sec (whole surface exposure using red light)

The image formation was effected by line-scanning the laser beam corresponding to character and image signals. As a result, good prints were obtained with respect to the characters and images.

When successive image formation of 5,000 sheets was conducted, good prints were stably obtained from an initial stage to a stage after copying of 5,000 sheets.

Examples 8 and 9

Two photosensitive members were prepared in the same manner as in Example 7 except that a charge-transporting polycarbonate (for Example 8) prepared in Synthesis Example 7 (Mw=25,000) and a charge-transporting polycarbonate (for Example 9) prepared in Synthesis Example 8 (Mw=25,000) were used instead of the polycarbonate prepared in Synthesis Example 6, respectively.

Each of the thus prepared photosensitive members was subjected to measurement of $V_0$, $V_1$ and $E_{1/2}$ in the same manner as in Example 7, whereby the following results were obtained.

|  | $V_0$ | $V_1$ | $E_{1/2}$ |
| --- | --- | --- | --- |
| Example 8 | −660 (V) | −655 (V) | 2.5 (μJ/cm$^2$) |
| Example 9 | −650 | −640 | 1.4 |

Example 10

A coating liquid for a CGL was prepared by dispersing 5 g of titanyloxyphthalocyanine in a solution of 3 g of a phenoxy resin in 100 g of cyclohexanone for 24 hours in a ball mill. The coating liquid was applied onto a 50 μm-thick aluminum sheet by a wire bar and dried for 10 minutes at 100° C. to form a 0.6 μm-thick CGL.

Then, 10 g of a charge-transporting polycarbonate prepared in Synthesis Example 4 used in Example 4 and 5 g of a bisphenol Z-type polycarbonate resin (polycarbonate Z resin) (Mw=22,000) were dissolved in 80 g of monochlorobenzene. The solution was applied onto the CGL by wire bar coating and dried for 1 hour at 120° C. to form a 25 microns-thick CTL, whereby a photosensitive layer was obtained.

The thus prepared photosensitive layer was wound bout the peripheral surface of an aluminum cylinder (outer diameter of 30 mm) to form an electrophotographic photosensitive member. The thus prepared photosensitive member was subjected to measurement of $V_0$, $V_1$ and $E_{1/2}$ in the same manner as in Example 7, whereby the following results were obtained.

$V_0$: −660 (V)
$V_1$: −650 (V)
$E_{1/2}$: 0.8 (μJ/cm²)

Example 11

A coating liquid for a CGL was prepared by adding 9 g of a bisazo pigment of the formula:

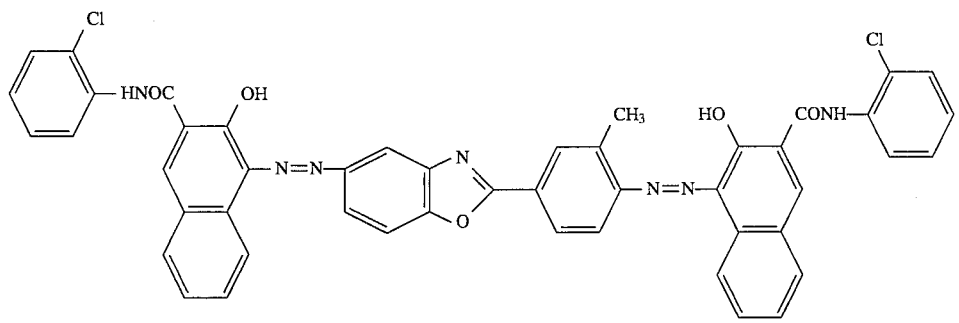

to a solution of 5 g of a butyral resin (butyral degree of 70 mol. %) in 300 ml of cyclohexanone and dispersing for 10 hours by means of a sand mill.

The coating liquid for the CGL was applied onto a 50 μm-thick aluminum sheet by a wire bar and dried to obtain a 0.2 μm-thick CGL.

Then, 10 g of a charge-transporting polycarbonate prepared in Synthesis Example 9 (weight-average molecular weight (Mw=22,000) was dissolved in 70 g of monochlorobenzene to prepare a coating liquid.

The coating liquid was applied onto the above-prepared CGL by means of a wire bar, followed by drying to form a CTL having a thickness of 27 microns, whereby an electrophotographic photosensitive member was prepared.

The thus prepared photosensitive member was evaluated in the same manner as in Example 1.

The results are shown in Table 3.

Examples 12 and 13

Two electrophotographic photosensitive members were prepared and evaluated in the same manner as in Example 11 except that the charge-transporting polycarbonate prepared in Synthesis Example 9 used in Example 11 was changed to those prepared in Synthesis Examples 10 and 11 (for Examples 12 and 13), respectively, and that the CGM was changed to a CGM of the following formula:

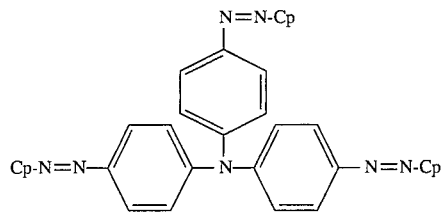

-continued

Cp:

The two charge-transporting polycarbonates used in Examples 12 and 13 had an Mw of 29,000.

TABLE 3

| | | | | Initial | | After 10,000 sheets | |
|---|---|---|---|---|---|---|---|
| Ex. | $V_0$ (−V) | $V_1$ (−V) | $E_{1/2}$ (lux · sec) | $V_D$ (−V) | $V_L$ (−V) | $V_D$ (−V) | $V_L$ (−V) |
| 11 | 650 | 635 | 2.5 | 700 | 300 | 680 | 320 |

The results are shown in Table 4 appearing below.

Example 14

A coating liquid for a CGL was prepared by adding 15 g of a bisazo pigment of the formula:

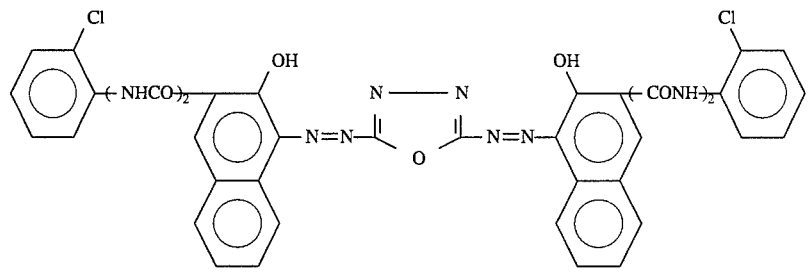

to a solution of 7 g of a butyral resin (butyral degree of 67 mol. %) in 280 ml of cyclohexanone and dispersing for 15 hours by means of a sand mill.

The coating liquid for the CGL was applied onto a 50 μm-thick aluminum sheet by a wire bar and dried to obtain a 0.2 μm-thick CGL.

Then, 15 g of a charge-transporting polycarbonate prepared in Synthesis Example 10 used in Example 12 and 10 g of a polycarbonate Z resin (Mw=20,000) were dissolved in 70 g of mono-chlorobenzene to prepare a coating liquid.

The coating liquid was applied onto the above-prepared CGL by means of a wire bar, followed by drying to form a CTL having a thickness of 25 microns, whereby an electrophotographic photosensitive member was prepared.

The thus prepared photosensitive member was evaluated in the same manner as in Example 1. The results are shown in Table 4.

Example 15

A coating liquid for a CGL was prepared by adding 12 g of a bisazo pigment of the formula:

Then, 20 g of a charge-transporting polycarbonate prepared in Synthesis Example 9 used in Example 11 and 5 g of a hydrazone compound of the formula shown below were dissolved in 80 g of monochlorobenzene to prepare a coating liquid.

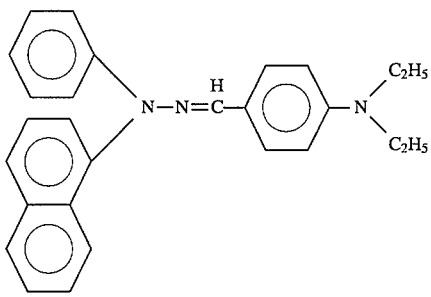

The coating liquid was applied onto the above-prepared CGL by means of a wire bar, followed by drying to form a CTL having a thickness of 22 microns, whereby an electrophotographic photosensitive member was prepared.

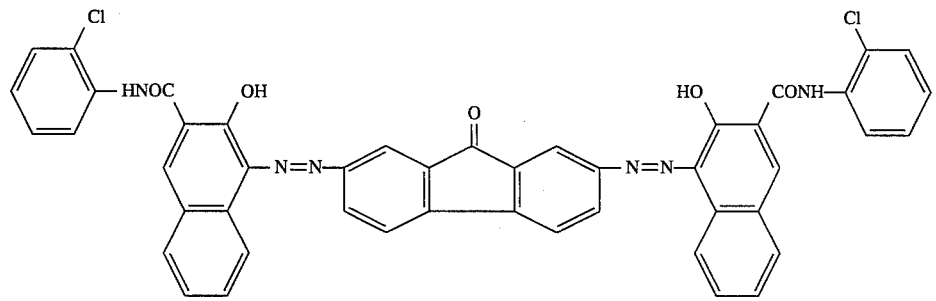

to a solution of 5 g of a butyral resin (butyral degree of 67 mol %) in 200 ml of cyclohexanone and dispersing for 10 hours by means of a sand mill.

The coating liquid for the CGL was applied onto a 50 μm-thick aluminum sheet by a wire bar and dried to obtain a 0.1 μm-thick CGL.

The thus prepared photosensitive member was evaluated in the same manner as in Example 1. The results are shown in Table 4 below.

TABLE 4

| Ex. | $V_0$ (−V) | $V_1$ (−V) | $E_{(½)}$ (lux · sec) | Initial | | After 10,000 sheets | |
|---|---|---|---|---|---|---|---|
| | | | | $V_D$ (−V) | $V_L$ (−V) | $V_D$ (−V) | $V_L$ (−V) |
| 12 | 640 | 630 | 2.0 | 700 | 300 | 670 | 320 |
| 13 | 650 | 640 | 2.3 | 700 | 300 | 680 | 320 |
| 14 | 660 | 650 | 2.7 | 700 | 300 | 680 | 330 |

TABLE 4-continued

| Ex. | $V_0$ (−V) | $V_1$ (−V) | $E_{(1/2)}$ (lux · sec) | Initial | | After 10,000 sheets | |
|---|---|---|---|---|---|---|---|
| | | | | $V_D$ (−V) | $V_L$ (−V) | $V_D$ (−V) | $V_L$ (−V) |
| 15 | 650 | 635 | 2.1 | 700 | 300 | 670 | 310 |

Example 16

Onto the peripheral surface of an aluminum cylinder (outer diameter of 30 mm), a solution of 10 g of an N-methoxymethylated 6-nylon resin (Mw=5,000) and 5 g of an alcohol-soluble copolymer nylon resin (Mw=7,000) in 250 g of methanol was applied by means of a wire bar, followed by drying to form a 1 micron-thick undercoating layer.

A coating liquid for a CGL was prepared by dispersing 5 g of a CGM having the formula shown below, 3 g of a butyral resin (butyral degree of 70%; Mw=4,000) and 100 g of dioxane for 24 hours by means of a ball mill. The coating liquid was applied onto the undercoating layer by blade coating and dried to form a 0.2 μm-thick CGL.

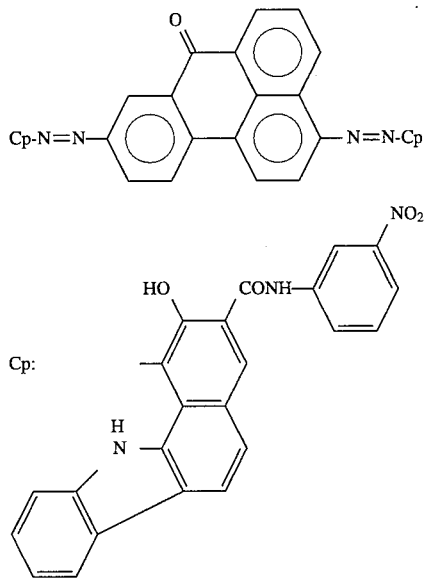

Then, 15 g of a charge-transporting polycarbonate prepared in Synthesis Example 11 used in Example 13 was dissolved in 60 g of monochlorobenzene. The solution was applied onto the CGL by blade coating and dried to form 27 microns-thick CTL, whereby an electrophotographic photosensitive member was obtained.

The thus prepared photosensitive member was subjected to measurement of $V_0$, $V_1$ and $E_{1/2}$ in the same manner as in Example 7.

The results were as follows:

$V_0$: −640 V $V_1$: −630 V $E_{1/2}$: 1.7 μJ/cm$^2$

The above-mentioned photosensitive member was assembled in a laser beam printer used in Example 7 and subjected to image formation.

The image formation conditions used herein were as follows:

surface potential after primary charging: −700 V surface potential after image exposure: −200 V (exposure quantity of 3.1 μJ/cm$^2$)

transfer potential: +700 V polarity of developing: negative process speed: 50 mm/sec developing condition (developing bias): −450 V image exposure scanning system: image scan exposure prior to the primary charging: 15 lux.sec (whole surface exposure using red light)

The image formation was effected by line-scanning the laser beam corresponding to character and image signals. As a result, good prints were obtained with respect to the characters and images.

When successive image formation of 5,000 sheets was conducted, good prints were stably obtained from an initial stage to a stage after copying of 5,000 sheets.

Examples 17 and 18

Two photosensitive members were prepared in the same manner as in Example 16 except that a charge-transporting polycarbonate (for Example 17) prepared in Synthesis Example 12 (Mw=24,000) and a charge-transporting polycarbonate (for Example 18) prepared in Synthesis Example 13 (Mw=24,000) were used instead of the polycarbonate prepared in Synthesis Example 11 used in Example 16, respectively.

Each of the thus prepared photosensitive members was subjected to measurement of $V_0$, $V_1$ and $E_{1/2}$ in the same manner as in Example 7, whereby the following results were obtained.

| | $V_0$ | $V_1$ | $E_{1/2}$ |
|---|---|---|---|
| Example 17 | −640 (V) | −630 (V) | 3.7 (μJ/cm$^2$) |
| Example 18 | −640 | −630 | 2.2 |

Example 19

A coating liquid for a CGL was prepared by dispersing 5 g of titanyloxyphthalocyanine in a solution of 3 g of a phenoxy resin in 100 g of cyclohexanone for 24 hours in a ball mill. The coating liquid was applied onto a 50 μm-thick aluminum sheet by a wire bar and dried for 10 minutes at 100° C. to form a 0.6 μm-thick CGL.

Then, 10 g of a charge-transporting polycarbonate prepared in Synthesis Example 10 used in Example 12 and 7 g of a bisphenol Z-type polycarbonate resin (polycarbonate Z resin) (Mw=22,000) were dissolved in 80 g of monochlorobenzene. The solution was applied onto the CGL by wire bar coating and dried for 1 hour at 120° C. to form a 25 microns-thick CTL, whereby a photosensitive layer was obtained.

The thus prepared photosensitive layer was wound bout the peripheral surface of an aluminum cylinder (outer diameter of 30 mm) to form an electrophotographic photosensitive member. The thus prepared photosensitive member was subjected to measurement of $V_0$, $V_1$ and $E_{1/2}$ in the same manner as in Example 16, whereby the following results were obtained.

$V_0$: −670 (V)
$V_1$: −660 (V)
$E_{1/2}$: 1.1 (μJ/cm$^2$)

Example 20

A coating liquid for a CGL was prepared by adding 10 g of a bisazo pigment of the formula:

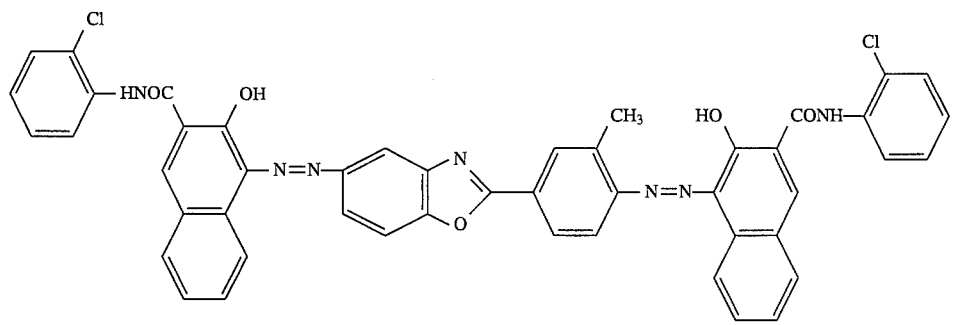

to a solution of 5 g of a butyral resin (butyral degree of 67 mol. %) in 250 ml of cyclohexanone and dispersing for 15 hours by means of a sand mill.

The coating liquid for the CGL was applied onto a 50 μm-thick aluminum sheet by a wire bar and dried to obtain a 0.4 μm-thick CGL.

Then, 20 g of a charge-transporting polycarbonate prepared in Synthesis Example 14 (weight-average molecular weight (Mw=25,000) was dissolved in 70 g of monochlorobenzene to prepare a coating liquid.

The coating liquid was applied onto the above-prepared CGL by means of a wire bar, followed by drying to form a CTL having a thickness of 21 microns, whereby an electrophotographic photosensitive member was prepared.

The thus prepared photosensitive member was evaluated in the same manner as in Example 1.

The results are shown in Table 5.

TABLE 5

| Ex. | $V_0$ (−V) | $V_1$ (−V) | $E_{1/2}$ (lux · sec) | Initial $V_D$ (−V) | Initial $V_L$ (−V) | After 10,000 sheets $V_D$ (−V) | After 10,000 sheets $V_L$ (−V) |
|---|---|---|---|---|---|---|---|
| 20 | 660 | 650 | 3.0 | 700 | 300 | 680 | 310 |

Examples 21 and 22

These electrophotographic photosensitive members were prepared and evaluated in the same manner as in Example 20 except that the charge-transporting polycarbonate prepared in Synthesis Example 14 used in Example 20 was changed to those prepared in Synthesis Examples 15 and 16 (for Examples 21 and 22), respectively, and that the CGM was changed to a CGM of the following formula:

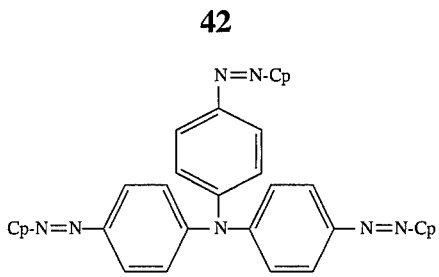

-continued

Cp:

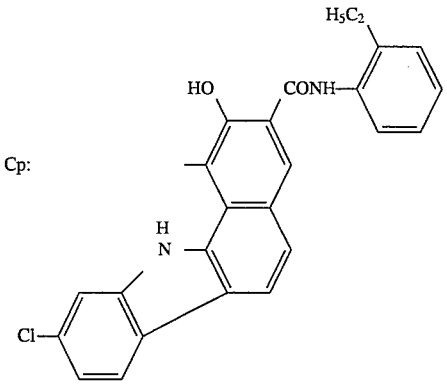

The two charge-transporting polycarbonates used in Examples 21 and 22 had an Mw of 21,000.

The results are shown in Table 6 appearing below.

Example 23

A coating liquid for a CGL was prepared by adding 12 g of a bisazo pigment of the formula:

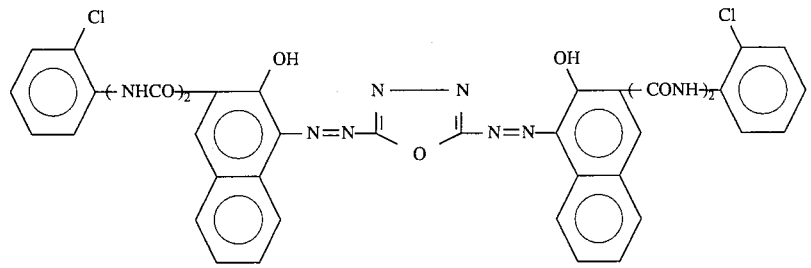

to a solution of 6 g of a butyral resin (butyral degree of 70 mol. %) in 300 ml of cyclohexanone and dispersing for 20 hours by means of a sand mill.

The coating liquid for the CGL was applied onto a 50 μm-thick aluminum sheet by a wire bar and dried to obtain a 0.2 μm-thick CGL.

Then, 15 g of a charge-transporting polycarbonate prepared in Synthesis Example 14 used in Example 20 and 8 g of a polycarbonate Z resin (Mw=20,000) were dissolved in 70 g of mono-chlorobenzene to prepare a coating liquid.

The coating liquid was applied onto the above-prepared CGL by means of a wire bar, followed by drying to form a CTL having a thickness of 20 microns, whereby an electrophotographic photosensitive member was prepared.

The thus prepared photosensitive member was evaluated in the same manner as in Example 1. The results are shown in Table 6.

Example 24

A coating liquid for a CGL was prepared by adding 12 g of a bisazo pigment of the formula:

Then, 20 g of a charge-transporting polycarbonate prepared in Synthesis Example 15 used in Example 21 and 5 g of a triphenylamine compound of the formula shown below were dissolved in 80 g of monochlorobenzene to prepare a coating liquid.

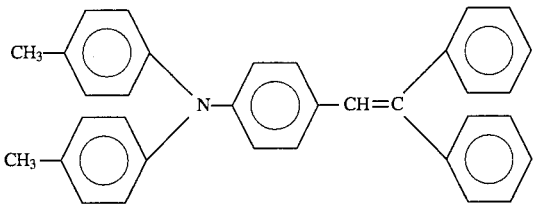

The coating liquid was applied onto the above-prepared CGL by means of a wire bar, followed by drying to form a CTL having a thickness of 22 microns, whereby an electrophotographic photosensitive member was prepared.

The thus prepared photosensitive member was evaluated in the same manner as in Example 1. The results are shown in Table 6 below.

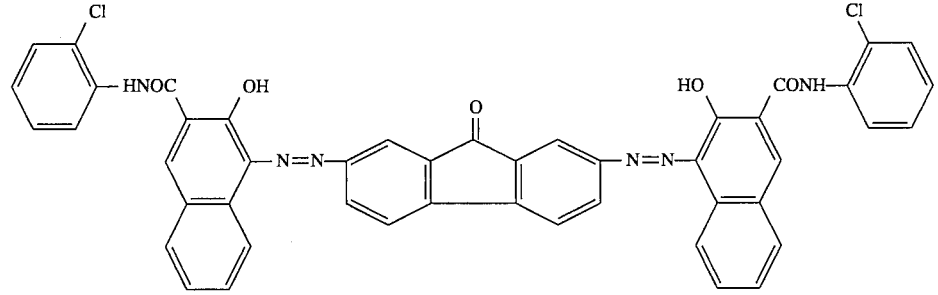

to a solution of 7 g of a butyral resin (butyral degree of 75 mol. %) in 200 ml of cyclohexanone and dispersing for 15 hours by means of a sand mill.

The coating liquid for the CGL was applied onto a 50 μm-thick aluminum sheet by a wire bar and dried to obtain a 0.4 μm-thick CGL.

TABLE 6

| Ex. | $V_0$ (−V) | $V_1$ (−V) | $E_{(1/2)}$ (lux · sec) | Initial | | After 10,000 sheets | |
|---|---|---|---|---|---|---|---|
| | | | | $V_D$ (−V) | $V_L$ (−V) | $V_D$ (−V) | $V_L$ (−V) |
| 21 | 650 | 640 | 2.4 | 700 | 300 | 670 | 320 |
| 22 | 660 | 650 | 2.7 | 700 | 300 | 680 | 330 |
| 23 | 650 | 630 | 2.1 | 700 | 300 | 670 | 330 |
| 24 | 640 | 625 | 1.7 | 700 | 300 | 670 | 315 |

Example 25

Onto the peripheral surface of an aluminum cylinder (outer diameter of 30 mm), a solution of 10 g of an N-methoxymethylated 6-nylon resin (Mw=5,000) and 5 g of an alcohol-soluble copolymer nylon resin (Mw=7,000) in 250 g of methanol was applied by means of a wire bar, followed by drying to form a 1 micron-thick undercoating layer.

A coating liquid for a CGL was prepared by dispersing 5 g of a CGM having the formula shown below, 4 g of a butyral resin (butyral degree of 67%; Mw=4,000) and 100 g of dioxane for 24 hours by means of a ball mill. The coating liquid was applied onto the undercoating layer by blade coating and dried to form a 0.4 μm-thick CGL.

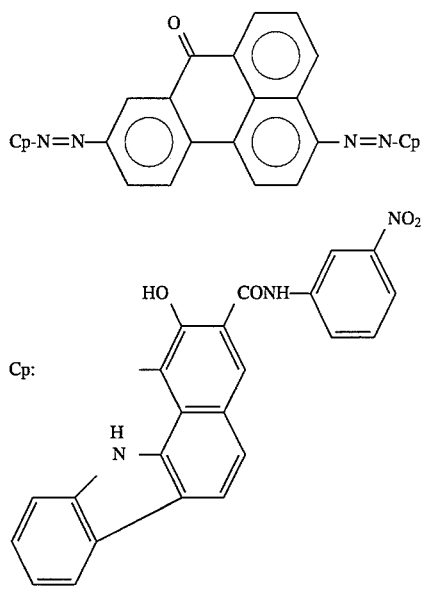

Then, 15 g of a charge-transporting polycarbonate prepared in Synthesis Example 16 used in Example 22 was dissolved in 60 g of monochlorobenzene. The solution was applied onto the CGL by blade coating and dried to form 27 microns-thick CTL, whereby an electrophotographic photosensitive member was obtained.

The thus prepared photosensitive member was subjected to measurement of $V_0$, $V_1$ and $E_{1/2}$ in the same manner as in Example 7.

The results were as follows:

$V_0$: −650 V
$V_1$: −630 V
$E_{1/2}$: 1.9 μJ/cm$^2$

The above-mentioned photosensitive member was assembled in a laser beam printer used in Example 7 and subjected to image formation.

The image formation conditions were set to those used in Example 16.

The image formation was effected by line-scanning the laser beam corresponding to character and image signals. As a result, good prints were obtained with respect to the characters and images.

When successive image formation of 5,000 sheets was conducted, good prints were stably obtained from an initial stage to a stage after copying of 5,000 sheets.

Examples 26 and 27

Two photosensitive members were prepared in the same manner as in Example 25 except that a charge-transporting polycarbonate (for Example 26) prepared in Synthesis Example 17 (Mw=25,000) and a charge-transporting polycarbonate (for Example 27) prepared in Synthesis Example 18 (Mw=25,000) were used instead of the polycarbonate prepared in Synthesis Example 16 used in Example 25, respectively.

Each of the thus prepared photosensitive members was subjected to measurement of $V_0$, $V_1$ and $E_{1/2}$ in the same manner as in Example 7, whereby the following results were obtained.

|  | $V_0$ | $V_1$ | $E_{1/2}$ |
|---|---|---|---|
| Example 26 | −660 (V) | −650 (V) | 3.1 (μJ/cm$^2$) |
| Example 27 | −650 | −640 | 2.3 |

Example 28

A coating liquid for a CGL was prepared by dispersing 5 g of titanyloxyphthalocyanine in a solution of 2 g of a phenoxy resin in 100 g of cyclohexanone for 24 hours in a ball mill. The coating liquid was applied onto a 50 μm-thick aluminum sheet by a wire bar and dried for 10 minutes at 100° C. to form a 0.6 μm-thick CGL.

Then, 10 g of a charge-transporting polycarbonate prepared in Synthesis Example 15 used in Example 21 and 7 g of a bisphenol Z-type polycarbonate resin (polycarbonate Z resin) (Mw=22,000) were dissolved in 80 g of monochlorobenzene. The solution was applied onto the CGL by wire bar coating and dried for 1 hour at 120° C. to form a 25 microns-thick CTL, whereby a photosensitive layer was obtained.

The thus prepared photosensitive layer was wound bout the peripheral surface of an aluminum cylinder (outer diameter of 30 mm) to form an electrophotographic photosensitive member. The thus prepared photosensitive member was subjected to measurement of $V_0$, $V_1$ and $E_{1/2}$ in the same manner as in Example 25, whereby the following results were obtained.

$V_0$: −650 (V)
$V_1$: −640 (V)
$E_{1/2}$: 1.1 (μJ/cm$^2$)

As described hereinabove, according to the present invention, there is provided an electrophotographic photosensitive member characterized by a photosensitive layer comprising a polycarbonate having a charge-transporting group at least in a side chain of the polycarbonate. The photosensitive member shows a high photosensitivity and a decreased potential stability in respect of a light part potential and a dark part potential when used in a continuous image formation by a repetitive charging and exposure, etc., thus being excellent in a durability.

What is claimed is:

1. An electrophotographic photosensitive member, comprising:

a support and a photosensitive layer comprising a charge generation layer and a charge transport layer disposed on the support, said charge transport layer comprising a polycarbonate which has a charge-transporting group having a triphenylamine structure, a hydrazone structure or a biphenylamine structure at least in a side chain, wherein said polycarbonate has a recurring unit represented by the following formula (A):

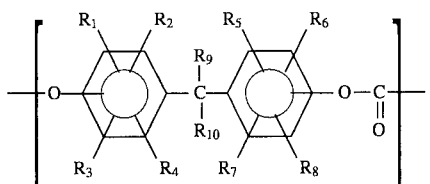

wherein $R_1$ to $R_8$ are independently selected from the group consisting of hydrogen, halogen, alkyl group capable of having a substituent, alkenyl group capable of having a substituent, alkoxy group capable of having a substituent and aryl group capable of having a substituent; and one of $R_9$ and $R_{10}$ is a group containing said charge transporting group and the other group $R_9$ or $R_{10}$ is hydrogen, alkyl group capable of having a substituent, alkenyl group capable of having a substituent or aryl group capable of having a substituent; and both of $R_9$ and $R_{10}$ can be a group containing said charge transporting group.

2. An electrophotographic photosensitive member, comprising:

a support, and a photosensitive layer containing a charge generating material and a polycarbonate which has a charge-transporting group having a triphenylamine structure, a hydrazone structure or a biphenylamine structure at least in a side chain, wherein said polycarbonate has a recurring unit represented by the following formula A:

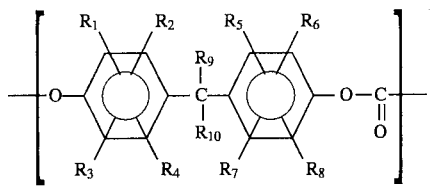

wherein $R_1$ to $R_8$ are independently selected from the group consisting of hydrogen, halogen, alkenyl group capable of having a substituent, alkyl group capable of having a substituent, alkoxy group capable of having a substituent and aryl group capable of having a substituent; and one of $R_9$ and $R_{10}$ is a group containing said charge transporting group and the other group of $R_9$ or $R_{10}$ is hydrogen, alkyl group capable of having a substituent, alkenyl group capable of having a substituent or aryl group capable of having a substituent; and both of $R_9$ and $R_{10}$ can be a group containing said charge transporting group.

3. A member according to claim 1 or claim 2 wherein said charge-transporting group is selected from the group consisting of the structure of the formula (C), the structure of the formula (D) and the structure of the formula (E) below:

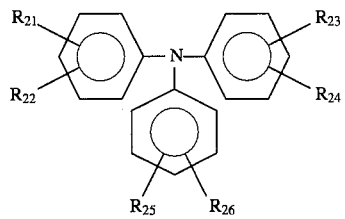

wherein any one of $R_{21}$ to $R_{26}$ is divalent and is connected with a main chain of said polycarbonate or any one of $R_{21}$ to $R_{26}$ is replaced by $-(CH_2)_c-$ where c is an integer of 0–5 and is connected with a main chain of said polycarbonate; $R_{21}$ to $R_{26}$ are independently selected from the group consisting of hydrogen, halogen, alkyl group capable of having a substituent, alkenyl group capable of having a substituent, aryl group capable of having a substituent, alkoxy group capable of having a substituent, arylamino group capable of having a substituent, arylether group capable of having a substituent, and aminoarylether group capable of having a substituent; and $R_{21}$ and $R_{22}$, $R_{23}$ and $R_{24}$, or $R_{25}$ and $R_{26}$ can be connected with each other to form carbocycle or heterocycle;

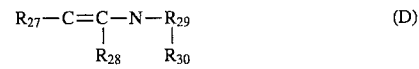

wherein any one of $R_{27}$ to $R_{30}$ is divalent and is connected with a main chain of said polycarbonate or any one of $R_{27}$ to $R_{30}$ is replaced by $-(CH_2)_d-$ where d is an integer of 0–5 and is connected with a main chain of said polycarbonate; $R_{27}$ and $R_{28}$ are independently selected from the group consisting of hydrogen, halogen, alkyl group capable of having a substituent, alkenyl group capable of having a substituent, aryl group capable of having a substituent, alkylidene group capable of having a substituent and a univalent group containing condensed polycyclic hydrocarbon; $R_{29}$ and $R_{30}$ are independently selected from the group consisting of alkyl group capable of having a substituent, alkenyl group capable of having a substituent, aryl group capable of having a substituent, alkoxy group capable of having a substituent, alkylidene group capable of having a substituent, and a univalent group containing condensed polycyclic hydrocarbon; and at least one of $R_{29}$ and $R_{30}$ is aryl group;

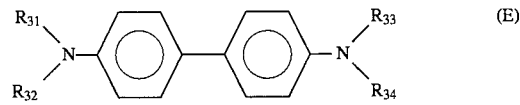

wherein any one of $R_{31}$ to $R_{34}$ is divalent and is connected with a main chain of said polycarbonate or any one of $R_{31}$ to $R_{34}$ is replaced by $-(CH_2)_e-$ where e is an integer of 0–5 and is connected with a main chain of said polycarbonate; $R_{31}$ and $R_{33}$ are independently selected from the group consisting of alkyl group capable of having a substituent, alkenyl group capable of having a substituent, and alkoxy group capable of having a substituent; and $R_{32}$ and $R_{34}$ are independently selected from the group consisting of alkyl group capable of having a substituent, alkenyl group capable of having a substituent, aryl group capable of having a substituent, and alkoxy group capable of having a substituent.

4. A member according to claim 1 or 2 wherein said polycarbonate has the recurring unit of the formula (A) and a recurring unit represented by the formula (B) below satisfying a relationship of $0<(A)/((A)+(B))\leq 1$ by mole:

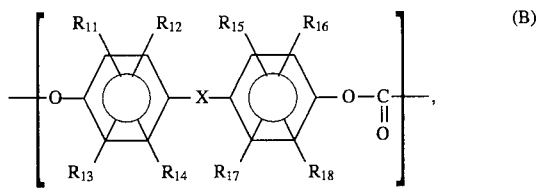

wherein $R_{11}$ to $R_{18}$ are independently selected from the group consisting of hydrogen, halogen, alkyl group capable of having a substituent, and aryl group capable of having a substituent; and

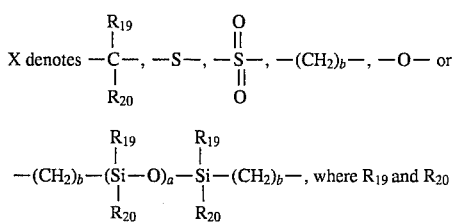

are independently selected from the group consisting of hydrogen, halogen, alkyl group capable of having a substituent, and aryl group capable of having a substituent; $R_{19}$ and $R_{20}$ can be connected with each other to form carbocycle or heterocycle; a is an integer of 0–2000; and b is an integer of 0–20.

5. A member according to claim 4, wherein said relationship is $0.1 \leq (A)/((A)+(B)) \leq 1$ by mole.

6. A member according to claim 1, wherein said polycarbonate has a weight-average molecular weight of 1,000–1,000,000.

7. A member according to claim 6, wherein said polycarbonate has a weight-average molecular weight of 2,000–700,000.

8. A member according to claim 1, wherein said charge transport layer comprises 50–100 wt. % of said polycarbonate.

9. An image forming method, comprising the steps of:
providing an electrophotographic photosensitive member according to any one of claims 1,
charging said photosensitive member,
performing image-exposure to said photosensitive member to form an electrostatic latent image, and
developing said latent image with a toner.

* * * * *

UNITED STATES PATENT AND TRADEMARK OFFICE
CERTIFICATE OF CORRECTION

PATENT NO. : 5,486,439
DATED : January 23, 1996
INVENTOR(S) : TEIGO SAKAKIBARA ET AL.   Page 1 of 3

It is certified that error appears in the above-identified patent and that said Letters Patent is hereby corrected as shown below:

On title page,

AT [54] TITLE

"ELECTROPHOTOGRAPHIC" should read
--ELECTROPHOTOGRAPHIC MEMBER--.

AT [57] ABSTRACT

Line 7, "has" should read --have--.

COLUMN 1

Line 1, "ELECTROPHOTOGRAPHIC" should read
--ELECTROPHOTOGRAPHIC MEMBER--.

COLUMN 2

Line 1, "(JP-B) No. 4188/1977/" should read
--(JP-B) No. 4188/1977;--.
Line 24, "has" should read --has been--.

COLUMN 3

Line 20, "hydrazone-structure" should read
--hydrazone structure--.

Line 21, "-CH=N-N" should read -- $-CH=N-N\diagup^{\diagdown}$

Line 52, "$R_24$," should read --$R_{24}$,--.

UNITED STATES PATENT AND TRADEMARK OFFICE
CERTIFICATE OF CORRECTION

PATENT NO. : 5,486,439
DATED : January 23, 1996
INVENTOR(S) : TEIGO SAKAKIBARA ET AL.   Page 2 of 3

It is certified that error appears in the above-identified patent and that said Letters Patent is hereby corrected as shown below:

COLUMN 22

Line 42, "(1)," should read --(1).--.

COLUMN 26

Line 34, "connected" should read --and connected to--.
Line 37, "carries" should read --carriers--.
Line 43, "carries" should read --carriers--.

COLUMN 28

Line 3, "tile" should read --the--.
Line 45, "electrostatic." should read --electrostatic--.

COLUMN 35

Line 1, "bout" should read --about--.

COLUMN 40

Line 65, "bout" should read --about--.

COLUMN 41

Line 7, "$E_{1/2}:1.1(\text{J/cm}^2)$" should read --$E_{1/2}:1.1(\mu\text{J/cm}^2)$--.

UNITED STATES PATENT AND TRADEMARK OFFICE
CERTIFICATE OF CORRECTION

PATENT NO.  : 5,486,439
DATED       : January 23, 1996
INVENTOR(S) : TEIGO SAKAKIBARA ET AL.

It is certified that error appears in the above-identified patent and that said Letters Patent is hereby corrected as shown below:

COLUMN 46

Line 35, "bout" should read --about--.

COLUMN 47

Line 50, "claim 2" should read --claim 2,--.

COLUMN 48

Line 52, "claim 2" should read --claim 2,-.

COLUMN 50

Line 1, "claim 1," should read --claim 1 or 2,--.
Line 12, "claims 1," should read --claims 1 or 2,--.

Signed and Sealed this

Ninth Day of July, 1996

Attest:

BRUCE LEHMAN

Attesting Officer

Commissioner of Patents and Trademarks